(12) United States Patent
Watanabe et al.

(10) Patent No.: US 12,061,467 B2
(45) Date of Patent: Aug. 13, 2024

(54) DATA PROCESSING APPARATUS, DATA PROCESSING METHOD, AND STORAGE MEDIUM STORING PROGRAM FOR DETERMINING AN ABNORMALITY BASED ON MANUFACTURING DATA

(71) Applicant: KABUSHIKI KAISHA TOSHIBA, Tokyo (JP)

(72) Inventors: Wataru Watanabe, Tokyo (JP); Takayuki Itoh, Kawasaki Kanagawa (JP); Jumpei Ando, Yokohama Kanagawa (JP); Keisuke Kawauchi, Kawasaki Kanagawa (JP); Toshiyuki Ono, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/682,125

(22) Filed: Feb. 28, 2022

(65) Prior Publication Data
US 2023/0055892 A1    Feb. 23, 2023

(30) Foreign Application Priority Data
Aug. 19, 2021    (JP) .................. 2021-134073

(51) Int. Cl.
*G05B 23/02*    (2006.01)
*G06F 18/23*    (2023.01)

(52) U.S. Cl.
CPC ....... *G05B 23/0221* (2013.01); *G05B 23/024* (2013.01); *G05B 23/0272* (2013.01); *G06F 18/23* (2023.01)

(58) Field of Classification Search
CPC .............. Y02P 90/30; G05B 19/41875; G05B 2219/32201; G05B 2219/32221;
(Continued)

(56) References Cited

U.S. PATENT DOCUMENTS

| | | | |
|---|---|---|---|
| 7,529,631 B2 * | 5/2009 | Matsushita | G05B 19/41875 |
| | | | 702/82 |
| 10,521,193 B2 | 12/2019 | Tasaki | |
| (Continued) | | | |

FOREIGN PATENT DOCUMENTS

| | | |
|---|---|---|
| JP | 2009021348 A | 1/2009 |
| JP | 4368905 B2 | 9/2009 |
| (Continued) | | |

OTHER PUBLICATIONS

Japanese Office Action (Decision to Grant) (and an English language translation thereof) dated Jun. 18, 2024, issued in counterpart Japanese Application No. 2021-134073.

*Primary Examiner* — Mischita L Henson
(74) *Attorney, Agent, or Firm* — Holtz, Holtz & Volek PC

(57) ABSTRACT

A data processing apparatus includes a processor. The processor generates visualization data for displaying estimation results of manufacturing conditions based on estimation results and relationship data. The relationship data includes first relationship data as a relationship between first manufacturing conditions recorded during an analysis, and second relationship data as a relationship between second manufacturing conditions corresponding. The processor divides the estimation results of the manufacturing conditions into a first group based on the first relationship data, and into a second group based on the second relationship data. The processor generates the visualization data based on a change in manufacturing condition relationship between the first group and the second group.

11 Claims, 16 Drawing Sheets

(58) Field of Classification Search
CPC ...... G05B 2219/32222; G05B 23/0221; G05B 23/024; G05B 23/0272
See application file for complete search history.

(56) References Cited

U.S. PATENT DOCUMENTS

| | | | |
|---|---|---|---|
| 11,442,435 B2* | 9/2022 | Koh | G06F 3/0484 |
| 2005/0251365 A1 | 11/2005 | Matsushita et al. | |
| 2008/0219544 A1 | 9/2008 | Tazaki et al. | |
| 2008/0278495 A1 | 11/2008 | Minamide et al. | |
| 2015/0153730 A1* | 6/2015 | Nishimura | G06Q 10/06 700/109 |
| 2019/0164101 A1* | 5/2019 | Koyama | G06Q 10/06393 |
| 2020/0184692 A1* | 6/2020 | Yang | G05B 19/4155 |
| 2021/0134032 A1 | 5/2021 | Watanabe et al. | |
| 2022/0083033 A1 | 3/2022 | Ando et al. | |
| 2022/0188307 A1 | 6/2022 | Watanabe et al. | |
| 2023/0081798 A1 | 3/2023 | Itoh et al. | |
| 2023/0244210 A1 | 8/2023 | Kawauchi et al. | |

FOREIGN PATENT DOCUMENTS

| | | | |
|---|---|---|---|
| JP | 4413673 | B2 | 2/2010 |
| JP | 2012038012 | A | 2/2012 |
| JP | 5014500 | B1 | 6/2012 |
| JP | 5186956 | B2 | 2/2013 |
| JP | 5866446 | B2 | 1/2016 |
| JP | 2018113027 | A | 7/2018 |
| JP | 2021071896 | A | 5/2021 |
| JP | 2022049395 | A | 3/2022 |
| JP | 2022092419 | A | 6/2022 |
| JP | 2023043703 | | 3/2023 |
| JP | 2023113024 | A | 8/2023 |
| WO | 2014006807 | A1 | 1/2014 |
| WO | 2015118946 | A1 | 8/2015 |
| WO | 2021015093 | A1 | 1/2021 |

\* cited by examiner

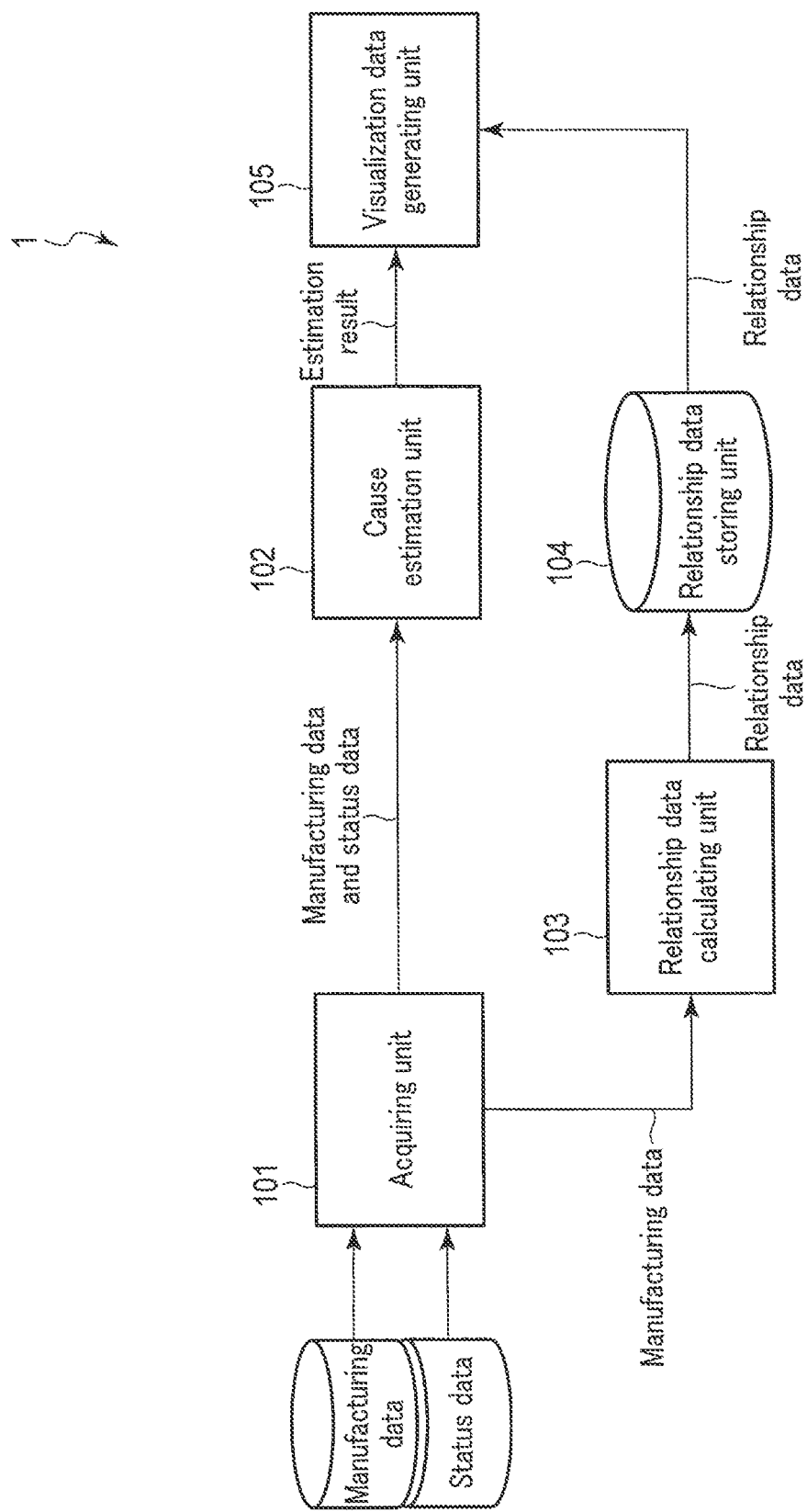
F I G. 1

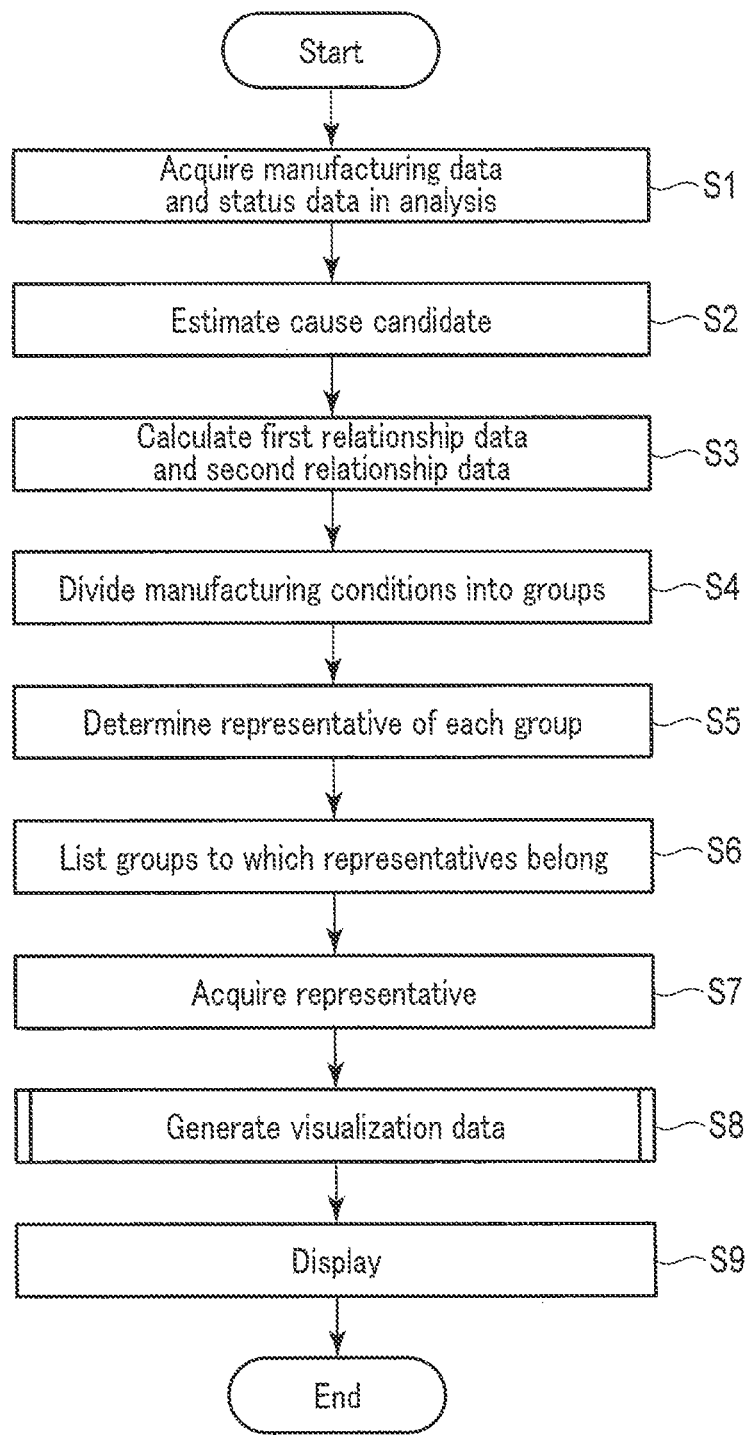
F I G. 2

| Product number | $c_1$ | $c_2$ | $c_3$ | $c_4$ | $c_5$ | $c_6$ |
|---|---|---|---|---|---|---|
| XXXX-00001 | A | C | 0.984976167 | 6 | 6 | A-1 |
| XXXX-00002 | A | C | 0.428337445 | 1 | 5 | A-2 |
| XXXX-00003 | B | D | 0.091870982 | 3 | 5 | A-3 |
| XXXX-00004 | B | D | 0.384644033 | 2 | 4 | A-4 |
| XXXX-00005 | A | C | 0.579640384 | 3 | 3 | A-5 |
| XXXX-00006 | A | C | 0.297917015 | 3 | 3 | A-6 |
| XXXX-00007 | A | C | 0.02231124 | 2 | 3 | A-7 |
| XXXX-00008 | B | D | 0.77225139 | 3 | 3 | A-8 |
| XXXX-00009 | B | D | 0.292869347 | 3 | 3 | A-1 |
| XXXX-00010 | A | C | 0.137229218 | 5 | 3 | A-2 |
| XXXX-00011 | A | C | 0.616594898 | 5 | 3 | A-3 |
| XXXX-00012 | B | D | 0.018106058 | 2 | 3 | A-4 |
| XXXX-00013 | B | D | 0.621334379 | 3 | 3 | A-5 |
| XXXX-00014 | A | C | 0.247096173 | 3 | 2 | A-6 |
| XXXX-00015 | A | C | 0.302249511 | 3 | 1 | A-7 |
| XXXX-00016 | B | D | 0.356374484 | 3 | 2 | A-8 |
| XXXX-00017 | B | D | 0.073878987 | 4 | 1 | A-17 |

F I G. 3

| Product number | V |
|---|---|
| XXXX-00001 | 0.685569195 |
| XXXX-00002 | 0.811569125 |
| XXXX-00003 | 0.53926036 |
| XXXX-00004 | 0.419434119 |
| XXXX-00005 | 0.980853061 |
| XXXX-00006 | 0.073292815 |
| XXXX-00007 | 0.992334542 |
| XXXX-00008 | 0.779452378 |
| XXXX-00009 | 0.578714341 |
| XXXX-00010 | 0.344663241 |
| XXXX-00011 | 0.644458571 |
| XXXX-00012 | 0.000000001 |
| XXXX-00013 | 0.132842057 |
| XXXX-00014 | 0.736797137 |
| XXXX-00015 | 0.189504253 |
| XXXX-00016 | 0.136445121 |
| XXXX-00017 | 0.999321151 |

FIG. 4

| Product number | $c_1$ | $c_2$ | $c_3$ | $c_4$ | $c_5$ | $c_6$ | v |
|---|---|---|---|---|---|---|---|
| XXXX-00001 | A | C | 0.984976167 | 6 | 6 | A-1 | A |
| XXXX-00002 | A | C | 0.428337445 | 1 | 5 | A-2 | A |
| XXXX-00003 | B | D | 0.091870982 | 3 | 5 | A-3 | B |
| XXXX-00004 | B | D | 0.384644033 | 2 | 4 | A-4 | B |
| XXXX-00005 | A | C | 0.579640384 | 3 | 3 | A-5 | A |
| XXXX-00006 | A | C | 0.297917015 | 3 | 3 | A-6 | A |
| XXXX-00007 | A | C | 0.02231124 | 2 | 3 | A-7 | A |
| XXXX-00008 | B | D | 0.77225139 | 3 | 3 | A-8 | B |
| XXXX-00009 | B | D | 0.292869347 | 3 | 3 | A-1 | B |
| XXXX-00010 | A | C | 0.137229218 | 5 | 3 | A-2 | A |
| XXXX-00011 | A | C | 0.616594898 | 5 | 3 | A-3 | A |
| XXXX-00012 | A | C | 0.018106058 | 2 | 3 | A-4 | A |
| XXXX-00013 | B | D | 0.621334379 | 3 | 3 | A-5 | B |
| XXXX-00014 | B | D | 0.247096173 | 3 | 2 | A-6 | B |
| XXXX-00015 | A | C | 0.302249511 | 3 | 1 | A-7 | A |
| XXXX-00016 | B | D | 0.356374484 | 3 | 2 | A-8 | B |
| XXXX-00017 | B | D | 0.073878987 | 4 | 1 | A-17 | B |

FIG. 5

|       | $C_1$ | $C_2$ | $C_3$ | ... | $C_M$ |
|-------|-------|-------|-------|-----|-------|
| $C_1$ | 1     | 0.99  | 0.1   | ... | 0.1   |
| $C_2$ | 0.99  | 1     | 0.2   | ... | 0.1   |
| $C_3$ | 0.1   | 0.2   | 1     | ... | 0.8   |
| ...   | ...   | ...   | ...   | ... | ...   |
| $C_M$ | 0.1   | 0.1   | 0.8   | ... | 1     |

FIG. 6

|       | Related manufacturing conditions |
|-------|----------------------------------|
| $C_1$ | $C_2$                            |
| $C_2$ | $C_1$                            |
| $C_3$ | $C_5$, $C_M$                     |
| ...   | ...                              |
| $C_M$ | $C_3$, $C_5$                     |

FIG. 7

|       | Group ID |
|-------|----------|
| $C_1$ | 1        |
| $C_2$ | 1        |
| $C_3$ | 2        |
| ...   | ...      |
| $C_M$ | 2        |

FIG. 8

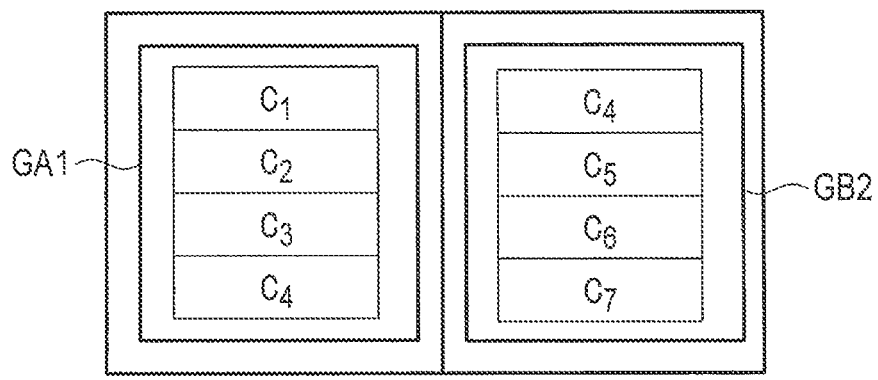
F I G. 15
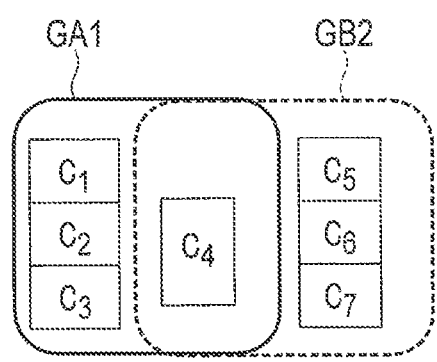
F I G. 16

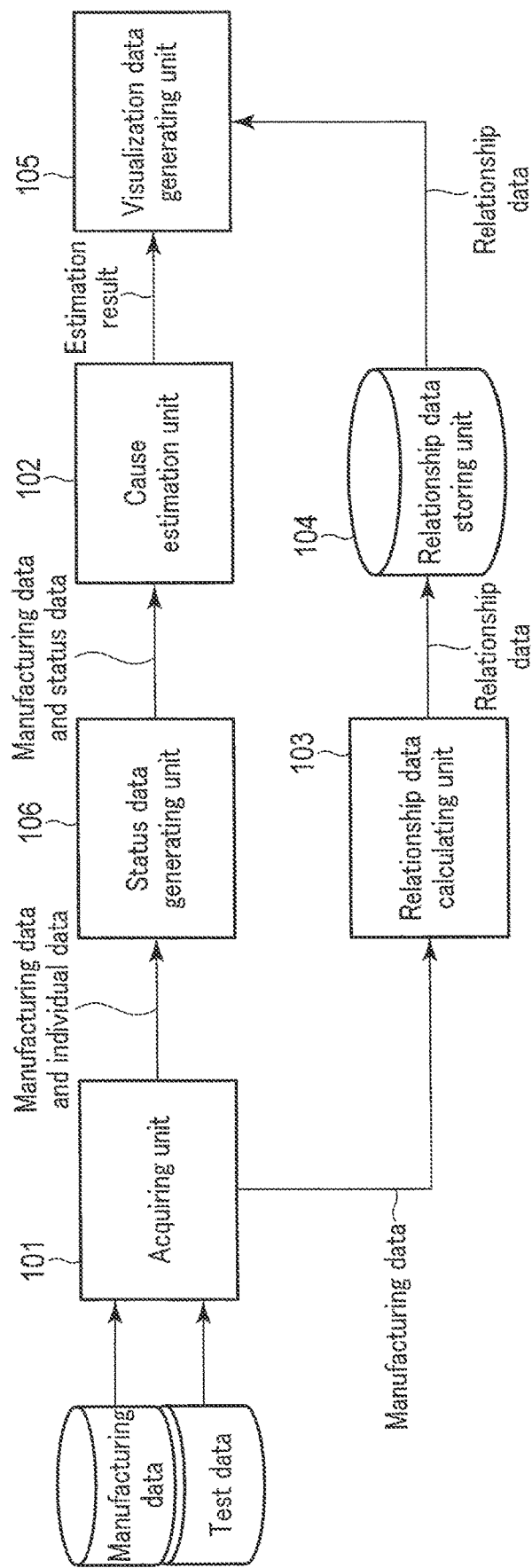
F I G. 17

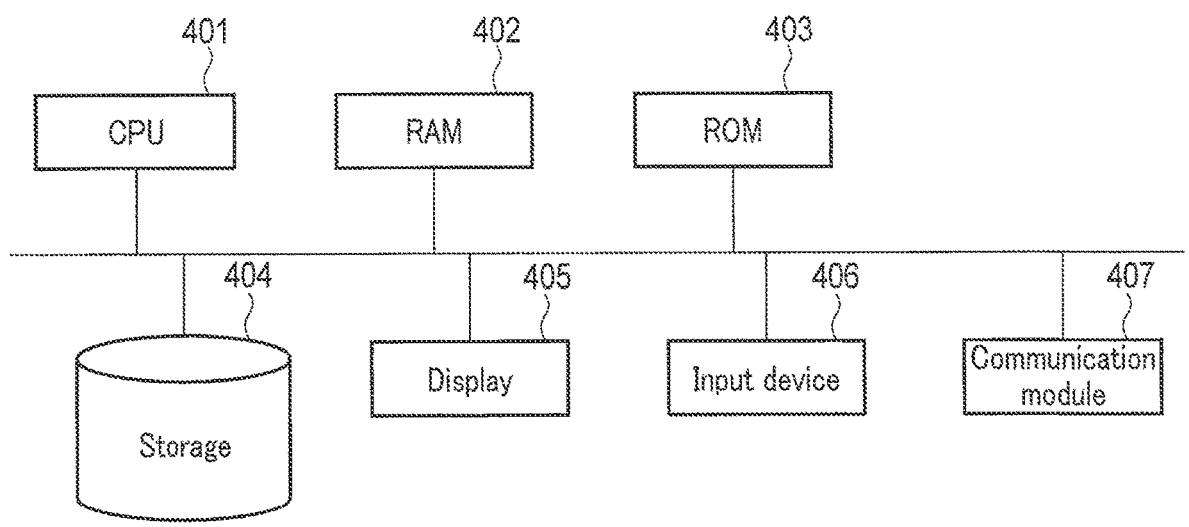
F I G. 20

DATA PROCESSING APPARATUS, DATA PROCESSING METHOD, AND STORAGE MEDIUM STORING PROGRAM FOR DETERMINING AN ABNORMALITY BASED ON MANUFACTURING DATA

CROSS-REFERENCE TO RELATED APPLICATIONS

This application is based upon and claims the benefit of priority from the Japanese Patent Application No. 2021-134073, filed Aug. 19, 2021, the entire contents of which are incorporated herein by reference.

FIELD

Embodiments described herein relate generally to a data processing apparatus, a data processing method, and a storage medium storing a program.

BACKGROUND

In the manufacturing industries, it is important to specify a cause of a specific status of a product in an early stage. For example, if a product changes to an abnormal status different from a normal status, specifying the cause in an early stage maintains and improves the yield. In many manufacturing industries, various kinds of data acquired during the manufacturing process are monitored, and this helps detect abnormality and specify the cause.

The contents of the data are various. For example, data about the manufacturing conditions of a product contains the names of materials and apparatuses used in the manufacture of the product. Also, data about the status of a product contains the size, physical characteristics, outer appearance quality, and the like of the manufactured product. Generally, these data are often related to an ID, a serial number, or the like as information capable of identifying each individual product.

Abnormality of a product or an apparatus may be detected by monitoring each item of individual data of the product. For example, if the value of individual data of a product among a group of products manufactured in a given period is different from a normal value, abnormality may have occurred in the product. In this case, manufacturing data including manufacturing condition data is thoroughly examined in order to find the cause of the product abnormality. For example, if it is specified from the manufacturing data that abnormal products were manufactured by only a specific apparatus, this apparatus may be the cause of the abnormality.

The number of data to be monitored increases as the number of steps required to and the number of apparatuses used to complete a product increase. Also, the recent progress of the IoT (Internet of Things) technologies makes easy acquisition of various kinds of manufacturing data possible. Accordingly, the number of items of the manufacturing data is increasing significantly. This makes it difficult to manually monitor the manufacturing data. Under the circumstances, demands have arisen for an apparatus that assists monitoring of the manufacturing data by the user.

BRIEF DESCRIPTION OF THE DRAWINGS

FIG. 1 is a block diagram showing a data processing apparatus according to the first embodiment;

FIG. 2 is a flowchart for explaining an analyzing process of the data processing apparatus;

FIG. 3 is a view showing an example of manufacturing data;

FIG. 4 is a view showing an example of status data;

FIG. 5 is a view showing data obtained by integrating the manufacturing data and the status data into one data;

FIG. 6 is a view showing an example of relationship data;

FIG. 7 is a view showing another example of the relationship data;

FIG. 8 is a view showing still another example of the relationship data;

FIG. 15 is a view showing large groups to be selected by division using the second relationship data when a manufacturing condition $C_4$ is set as a representative cause candidate manufacturing condition;

FIG. 16 is a Venn diagram showing the relationship between the large group GA1 and a large group GB2;

FIG. 17 is a block diagram showing a data processing apparatus according to the second embodiment;

FIG. 20 is a block diagram showing the hardware configuration of a data processing apparatus.

DETAILED DESCRIPTION

Figure 9:
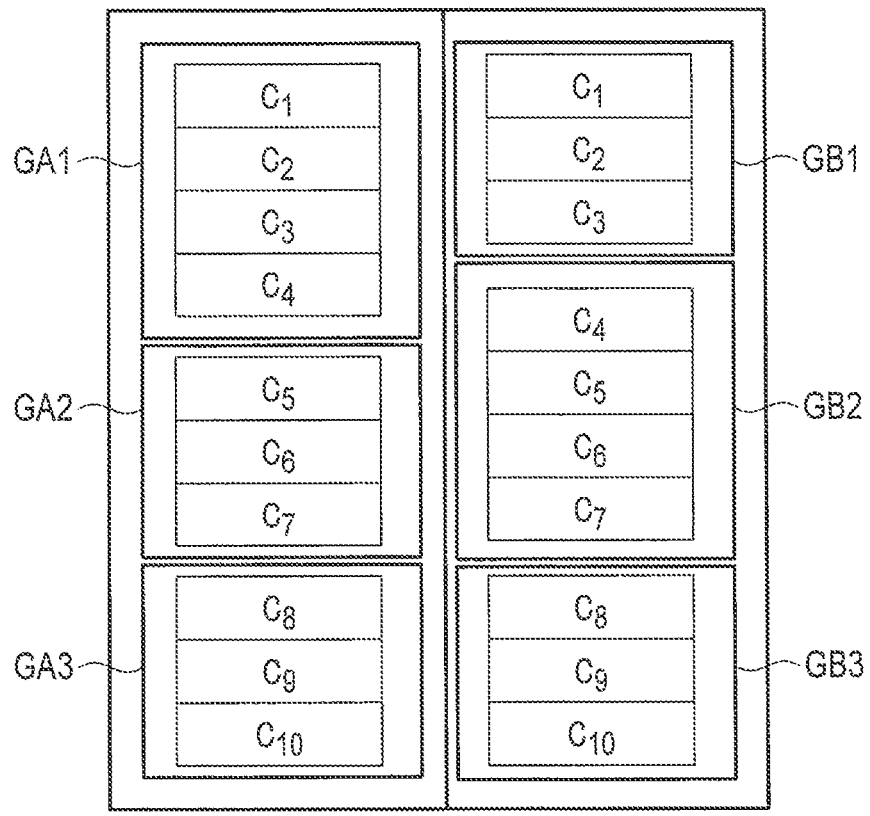
FIG. 9 is a view showing an example of division using first relationship data of cause candidate manufacturing conditions.

In general, according to one embodiment, a data processing apparatus includes a processor including hardware. The processor generates visualization data for displaying estimation results of manufacturing conditions of a plurality of cause candidates for a specific status of a product to be analyzed, based on the estimation results and relationship data representing a relationship between the manufacturing conditions of the plurality of cause candidates. The relationship data includes first relationship data as a relationship between a plurality of first manufacturing conditions as a plurality of manufacturing conditions of the product recorded during the analysis, and second relationship data as a relationship between a plurality of second manufacturing conditions corresponding to the first manufacturing conditions and different from the first manufacturing conditions. The processor divides the estimation results of the manufacturing conditions of the plurality of cause candidates into a first group based on the first relationship data, and into a second group based on the second relationship data. The processor generates the visualization data based on a change in manufacturing condition relationship between the first group and the second group.

First Embodiment

The first embodiment will be explained below. A data processing apparatus according to the first embodiment controls a display mode of a manufacturing condition as a cause of a given status of a product based on relationship data representing the relationship between manufacturing conditions.

FIG. 1 is a block diagram showing the data processing apparatus according to the first embodiment. Manufacturing data and status data of a product are input to a data processing apparatus 1. Based on the input manufacturing data and status data, the data processing apparatus 1 outputs visualization data for visually presenting information of a cause candidate for a given status of the product. The data processing apparatus 1 includes an acquiring unit 101, a cause estimation unit 102, a relationship data calculating unit 103, a relationship data storing unit 104, and a visualization data generating unit 105.

The acquiring unit 101 acquires manufacturing data and status data. The manufacturing data is data of various manufacturing conditions about the manufacture of a product. The status data is data indicating the degree of a given status of a product. Details of the manufacturing data and the status data will be explained later.

The cause estimation unit 102 estimates the manufacturing condition of a cause candidate for a specific status represented by the status data of a product, based on the manufacturing data and the status data. The specific status is, e.g., an abnormal status of a product. In this case, the cause estimation unit 102 estimates a manufacturing condition as a candidate for the cause of the abnormality.

The relationship data calculating unit 103 calculates relationship data representing the strength of the relationship between manufacturing conditions based on the manufacturing data. In the first embodiment, the relationship data contains first relationship data and second relationship data. The first relationship data is relationship data calculated based on manufacturing data obtained when the cause of a specific status of a product is analyzed. The manufacturing data obtained when the cause is analyzed is, e.g., manufacturing data obtained when a product has become a specific status. On the other hand, the second relationship data is relationship data calculated based on manufacturing data that corresponds to the manufacturing data used in the calculation of the first relationship data but differs from that manufacturing data. The manufacturing data corresponding to the manufacturing data used in the calculation of the first relationship data but different from that includes, for example, manufacturing data for designing a product, manufacturing data recorded in a period different from that of manufacturing data used in the calculation of the first relationship data, manufacturing data recorded when a product is not in a specific state, or data of statistical values such as the mean of manufacturing data used in the calculation of the first relationship data, the weighted mean of date/time of the manufacturing data, and the median of the manufacturing data.

The relationship data storing unit 104 stores the relationship data calculated by the relationship data calculating unit 103.

The visualization data generating unit 105 generates visualization data based on information of the estimation result of the cause estimation unit 102, and the relationship data stored in the relationship data storing unit 104. The visualization data is data for visually presenting information about the manufacturing condition of a cause candidate to the user. Based on the visualization data, the visualization data generating unit 105 can also control a process of displaying information about a cause candidate on a display as a peripheral device of the data processing apparatus 1.

Next, the operation of the data processing apparatus 1 will be explained. FIG. 2 is a flowchart for explaining an analyzing process of the data processing apparatus 1. The analyzing process can be performed at a timing at which a product has become a specific status, or a predetermined timing such as every day or every hour.

In step S1, the acquiring unit 101 acquires manufacturing data and status data for analysis. The manufacturing data and the status data are input from, e.g., a database connected as a peripheral device to the data processing apparatus 1. The manufacturing data and the status data can be formed by a file having a predetermined format such as CSV (Comma Separated Value). FIG. 1 shows an example in which the manufacturing data and the status data are separately input. When the manufacturing data and the status data are linked beforehand, e.g., formed by one file, the manufacturing data and the status data can also be acquired by a single input. The manufacturing data and the status data will further be explained below.

First, the manufacturing data will be explained. FIG. 3 is a view showing an example of the manufacturing data. In this manufacturing data shown in FIG. 3, the vertical direction will be called a column, and the horizontal direction will be called a row. In this case, the column direction of the manufacturing data represents an item of the manufacturing condition. Also, the row direction of the manufacturing data represents each individual product. The value of each cell in the manufacturing data represents the value of the manufacturing condition of each product.

The manufacturing data contains key data for identifying each individual product, and manufacturing condition data about data of the value of the manufacturing condition of each individual product. In this example shown in FIG. 3, the key data is a manufacturing number. Although the key data need not be a manufacturing number, the key data is desirably data capable of specifying an individual product. This data capable of specifying an individual is data such as a serial number and a character string unique to each product.

Referring to FIG. 3, the manufacturing data contains manufacturing condition data of D products. The D products are, e.g., products manufactured during a predetermined period. For example, products manufactured during a period such as an arbitrary hour or an arbitrary date are analyzed. When the time, date, and the like at which processing and testing of each product were performed are recorded in the database, the acquiring unit 101 acquires manufacturing data containing manufacturing condition data about products included in a period designated by the time, date, and the like. Also, when a lot number as a number representing a product unit corresponding to a predetermined period or a predetermined number, or a lot ID as a character string representing a product unit corresponding to a predetermined period or a predetermined number, is recorded in the database, the acquiring unit 101 can acquire manufacturing data containing manufacturing condition data about products of the designated lot number or lot ID. The acquiring unit 101 can also acquire manufacturing data containing manufacturing condition data about products corresponding to conditions designated by the user.

For the sake of the following explanation, assume that the manufacturing condition to be used as an item of the manufacturing condition data is represented by a set $\{C_k: k=1 \ldots M\}$. M represents the number of items of the manufacturing condition to be used as the manufacturing condition data. M is 6 in FIG. 3. For the sake of the following explanation, assume also that $C_{kd}$ represents the value of the kth manufacturing condition data of the dth product number. That is, $\{C_{kd} \in C_k: d=1 \ldots D\}$.

As the manufacturing condition, it is also possible to use information such as the name of a material used in a product, and the name of an apparatus used in processing or assembling of a product. More generally, information about 5M1E can be used as the manufacturing condition. 5M1E is a term obtained by arranging the initials of Man, Machine, Material, Method, Measurement, and Environment, and is widely known as six factors for managing the manufacturing process. Information of Man contains information such as the name of a processor. Information of Machine contains information such as the name of an apparatus used in the manufacture of a product, the name of a manufacturing line, and the status of the apparatus during the processing such as the temperature and the pressure. Information of Material contains information such as the ID or name of a material used in the manufacture of a product, and the ID or name of a part forming the product. Information of Method contains information such as the types of processing method and processing program of a product. Information of Measurement contains information such as the name of an apparatus used in measurement and the measurement position of a measured product. Information of Environment contains information such as the building name of a factory in which measurement was performed, and the temperature and the humidity when the measurement was performed. For example, $C_1$, $C_2$, $C_3$, $C_4$, $C_5$, and $C_6$ shown in FIG. 3 can respectively correspond to the information of Man, Machine, Material, Method, Measurement, and Environment. The acquiring unit 101 acquires the manufacturing condition data from the database so that the data contains manufacturing conditions necessary for the analysis. The acquiring unit 101 can also acquire the manufacturing condition data so that the data contains manufacturing conditions found to be useful for the analysis and the visualization by the user.

The status data will now be explained. FIG. 4 is a view showing an example of the status data. The status data is, e.g., data that represents the probability at which a product is in a specific status, and has a real number value from 0.0 to 1.0. That is, when the probability at which a product is in a specific status is high, the value of the status data approaches 1.0. For example, when the specific status is an abnormal status, the status data is data representing the probability at which a product is abnormal. The status data can also be regarded as data representing the degree to which a product is in a specific status.

The status data will be represented by V below for the sake of explanation. Also, the value of status data for the dth product number can be represented as $V_d$. That is, $\{V_d \in V: d=1 \ldots D\}$ holds. If a product has a plurality of statuses, a plurality of status data can exist. For example, the types (modes) of abnormality are often defined in the manufacturing site. In this case, the manufacturing condition of a cause candidate can be estimated for each mode by preparing status data for each mode.

The value of the status data can also be set by an apparatus different from the data processing apparatus 1. It is also possible to manually set the value of the status data by the user. Alternatively, the status data can also be set by a procedure of integrating, by averaging or the like, a plurality of results obtained by decisively evaluating whether a product is in a given status, e.g., an abnormal status. For example, if it is assumed that the evaluation of the status varies from one evaluator to another such as when evaluating the outer appearance of a product, it is favorable to adopt a method of integrating a plurality of evaluation results.

As shown in FIG. 4, the status data contains a product number as key data, like the manufacturing data. The key data is used to link the status data to the manufacturing data. The key data is not limited to the product number as long as the data is information that can be used to link the data to the manufacturing data. The key data can be a unique serial number, a unique character string, or the like.

The manufacturing data and the status data can be different data as shown in FIGS. 3 and 4, and can also be integrated data as shown in FIG. 5.

The explanation will return to FIG. 2. In step S2, the cause estimation unit 102 estimates the manufacturing condition of a cause candidate for a specific status of a product, which is represented by the status data, by using the manufacturing condition $C_k$ and the status data V. The cause estimation unit 102 estimates one or more manufacturing conditions having higher cause index values $F(V, C_k)$ calculated from the manufacturing condition $C_k$ and the status data V, as the manufacturing condition of a cause candidate. The cause index value $F(V, C_k)$ is an index representing the degree to which the cause of a specific status of a product, which is represented by the status data, is a specific manufacturing condition. The cause index value $F(V, C_k)$ will further be explained below.

The cause index value $F(V, C_k)$ in the embodiment can be an arbitrary index representing the degree to which the cause of a specific status of a product, which is represented by the status data, is the manufacturing condition $C_k$. For example, when the status data represents the probability of abnormality of a product, the cause index value $F(V, C_k)$ represents the degree to which the manufacturing condition $C_k$ is the cause of the abnormality. The cause index value $F(V, C_k)$ can be generated by, e.g., quantifying the deviation of a specific manufacturing condition $C_k$ for the status data V. For example, when the manufacturing condition $C_k$ is represented by categorical data such as the type of apparatus used in the manufacture of a product, a maximum value of the deviation rate can be regarded as the cause index value $F(V, C_k)$ by defining the deviation rate as the sum total of the status data $V_d$ of each apparatus/the sum total of the status data $V_d$ for all apparatuses. The cause index value $F(V, C_k)$ can also be generated by formulating the deviation of specific manufacturing condition data $C_k$ by the framework of a statistical test (chi-squared test, G test (likelihood ratio test)). When the manufacturing condition $C_k$ is represented by continuous value data instead of categorical data, the cause index value $F(V, C_k)$ can be generated by, e.g., quantifying the deviation as an index value by using the status data V, the manufacturing condition $C_k$, and a correlation coefficient. It is also possible to generate the cause index value $F(V, C_k)$ by inputting the manufacturing condition data and the status data to a learned model having learned the relationship between the manufacturing condition $C_k$ and the status data V by various machine learning methods. As described above, the method of generating the cause index value $F(V, C_k)$ is not limited to a specific method.

The explanation will return to FIG. 2. In step S3, the relationship data calculating unit 103 calculates first relationship data and second relationship data representing the strength of the relationship between the manufacturing conditions $C_k$ from the manufacturing data acquired by the acquiring unit 101. Then, the relationship data calculating unit 103 stores the calculated first relationship data and second relationship data in the relationship data storing unit 104. A method of calculating the first relationship data and the second relationship data will be explained below. The first relationship data and the second relationship data are calculated by using different manufacturing data, but they are calculated by the same data calculating method using the manufacturing data. Therefore, the calculating method will be explained by representing the first relationship data and the second relationship data as "relationship data" without distinguishing between them.

FIGS. 6, 7, and 8 are views showing examples of the relationship data. The relationship data shown in FIG. 6 is data having the form of a table representing a relationship index value matrix. The relationship index value matrix is an M×M matrix using, as an element, a relationship index value $R(i, j)$ representing the strength of the relationship between the ith manufacturing condition $C_i$ and the jth manufacturing condition $C_j$ of the manufacturing conditions $C_k$. The relationship index value $R(i, j)$ has a real number value from 0.0 to 1.0. The larger the value of the relationship index value $R(i, j)$, the stronger the relationship between the manufacturing conditions $C_i$ and $C_j$. Referring to FIG. 6, the value of a diagonal component (i=j) of the relationship index value matrix is 1.0. The diagonal component represents the strength of the relationship between identical manufacturing conditions, but it is unnecessary to define the strength of the relationship between identical manufacturing conditions. Accordingly, the diagonal component of the relationship index value matrix can take a value other than 1.0.

The relationship data need not be a matrix. For example, the relationship data shown in FIG. 7 is data having the form of a list enumerating manufacturing conditions $C_i$ having strong relationships with manufacturing conditions $C_j$. Also, as shown in FIG. 8, when manufacturing conditions $C_i$ and $C_j$ having strong relationships among the manufacturing conditions $C_k$ are grouped beforehand, the relationship data can be data having the form of a list enumerating, e.g., the IDs of groups to which the manufacturing conditions $C_k$ belong. The relationship data shown in FIGS. 7 and 8 can be generated from the relationship index value $R(i, j)$.

The relationship index value $R(i, j)$ will further be explained below. First, when the manufacturing conditions $C_i$ and $C_j$ are continuous value data, the relationship index value $R(i, j)$ can be calculated by Pearson's correlation coefficient (Pearson's product-moment correlation coefficient) known as an index indicating the strength of correlation between continuous values. When using the Pearson's correlation coefficient, the relationship index value $R(i, j)$ is calculated by, e.g., equation (1) below:

$$?? \qquad (1)$$

where $N_{all}$ is the number of samples, and equivalent to the total number of manufacturing data registered in the database in this embodiment. $C_{i\_ave}$ is the average value of data of the manufacturing conditions $C_i$ registered in the database. $C_{j\_ave}$ is the average value of data of the manufacturing conditions $C_j$ registered in the database. Note that the Pearson's correlation coefficient takes a real number value from −1 (inclusive) to 1 (inclusive). To obtain a value from 0.0 to 1.0, therefore, the absolute value of the Pearson's correlation coefficient is used in the relationship index value $R(i, j)$ of equation (1).

When the manufacturing conditions $C_i$ and $C_j$ are continuous value data, it is not always necessary to generate the relationship index value $R(i, j)$ based on the Pearson's correlation coefficient. The relationship index value $R(i, j)$ can also be generated by using, e.g., Spearman's rank correlation coefficient instead of the Pearson's correlation coefficient.

When the manufacturing conditions $C_i$ and $C_j$ are categorical data, the relationship index value $R(i, j)$ can be generated by using Cramer's V (Cramer's coefficient of association) known as an index indicating the strength of association between a row element and a column element in a cross-tabulation table. In this case, based on a cross-tabulation table of the manufacturing data registered in the database, the value of Cramer's V between the manufacturing conditions $C_i$ and $C_j$ of the manufacturing conditions registered in the database can be generated as the relationship index value $R(i, j)$. The relationship index value can also be generated by using a value that can be $R(i, j) \approx R(j, i)$, such as Goodman-Kruskal's T. Note that the cross tabulation table can also be calculated from the manufacturing data registered in the database. Note also that data of the cross tabulation table can be recorded in another database.

Furthermore, the relationship index value $R(i, j)$ can be calculated by using a well-known index or method representing the strength of the relationship between the manufacturing conditions $C_i$ and $C_j$.

In addition, the relationship data having the form shown in FIG. 7 is generated by, e.g., comparing the relationship index value $R(i, j)$ with an appropriate threshold value, and enumerating manufacturing conditions $C_i$ having the relationship index value $R(i, j)$ that is equal to or larger than the threshold value with respect to a given manufacturing condition $C_j$. The relationship data shown in FIG. 8 is generated by enumerating manufacturing conditions $C_i$ having the relationship index value $R(i, j)$ that is equal to or larger than a threshold value with respect to a given manufacturing condition $C_j$, and grouping the manufacturing conditions $C_j$ and $C_i$ by attaching IDs to them.

More preferably, the relationship data having the form shown in FIG. 7 or 8 is generated by a clustering problem using the relationship index value $R(i, j)$ as an input. For example, when graph clustering or graph partitioning is applied to a graph structure using the manufacturing condition $C_k$ as a node and the relationship index value $R(i, j)$ shown in FIG. 6 as a weight between nodes, the node representing the manufacturing condition $C_k$ is clustered. The relationship data having the form shown in FIG. 7 is generated by enumerating $C_j$ belonging to the same group as the manufacturing condition $C_i$ of a given node. Likewise, the relationship data having the form shown in FIG. 8 is generated by attaching a group ID to each clustered node. As the clustering method, spectral clustering can be used when, e.g., the number of clusters is known. It is also possible to use, e.g., the Louvain method as a method for quantifying the coarseness/denseness of connections in a graph structure and extracting a dense structure as a community. In addition, another well-known clustering method can be used to generate the relationship data shown in FIG. 7 or 8.

Furthermore, the relationship index value $R(i, j)$ for calculating the relationship data can also be generated by inputting the manufacturing conditions $C_i$ and $C_j$ to a learned model having learned the strength of the relationship between the manufacturing conditions $C_k$ by various machine learning methods.

In this embodiment, the second relationship data is calculated at the timing of step S3. Since, however, the second relationship data can be generated from data different from the manufacturing data acquired in step S1, the second relationship data need not be calculated at the timing of step S3. That is, the second relationship data can be calculated beforehand at a timing before the timing of the analyzing process. The second relationship data can also be generated by statistical processing using past manufacturing data including the manufacturing data acquired in step S1.

The explanation will return to FIG. 2. In step S4, the visualization data generating unit 105 divides the cause candidate manufacturing conditions $C_k$ estimated by the cause estimation unit 102 into one or more large groups by using the first relationship data. Also, the visualization data generating unit 105 divides the cause candidate manufacturing conditions $C_k$ estimated by the cause estimation unit 102 into one or more large groups by using the second relationship data. As shown in FIGS. 7 and 8, this group division can be performed by gathering manufacturing conditions having high relationship index values into one group.

In step S5, the visualization data generating unit 105 determines the manufacturing condition $C_j$ of a representative cause candidate of each large group divided by using the first relationship data. Examples of the selection criteria of the representative are as follows.
 a) Select a predetermined manufacturing condition for each large group.
 b) Select a manufacturing condition based on the cause index value $F(C_k, V)$ in a large group.
 c) Select a manufacturing condition for the first step in the order of steps.
 d) Select the first manufacturing condition in the order in a dictionary.
 e) Select a manufacturing condition by which the number of conditions is maximum or minimum.
 f) Select a manufacturing condition by using, as indices, a well-known statistical value, a test result, and the like for selecting the representative.

The visualization data generating unit 105 can select the manufacturing conditions $C_k$ of a plurality of representative cause candidates for each large group. The visualization data generating unit 105 can select, e.g., the manufacturing conditions of a plurality of cause candidates having the same cause index value $F(C_k, V)$. Alternatively, the visualization data generating unit 105 can select, e.g., the manufacturing conditions of a plurality of cause candidates for which the cause index value $F(C_k, V)$ is equal to or larger than a threshold value.

In step S6, the visualization data generating unit 105 compares large groups divided by using the first relationship data with large groups divided by using the second relationship data, and lists groups to which representatives belong.

The method of listing groups to which representatives belong will be explained below by using a practical example. In a manufacture base where manufacturing data is recorded, it is expected that various manufacturing conditions are changed, e.g., an apparatus is added and an operation is changed. When the manufacturing conditions are changed, the relationship between the manufacturing conditions also changes in many cases.

Manufacturing conditions supposed to have a relationship in the second relationship data calculated based on manufacturing conditions recorded in a normal status, e.g., at the time of designing, or manufacturing conditions recorded during a period in which no abnormality occurs, are supposed to reflect the manufacturing conditions when a product is designed or the manufacturing conditions in a normal status. On the other hand, manufacturing conditions supposed to have a relationship in the first relationship data calculated at the time of analysis, e.g., when abnormality occurs, are supposed to reflect the manufacturing conditions at the time of analysis.

A given manufacturing condition $C_j$ and another manufacturing condition $C_i$ have 1) a relationship in both of a group divided by using the first relationship data and a group divided by using the second relationship data, 2) a relationship in only a group divided by using the first relationship data, or 3) a relationship in only a group divided by using the second relationship data. The manufacturing condition having the relationship of 2) is a manufacturing condition by which the strength of the relationship at the time of analysis increases compared to that in a normal status. The manufacturing condition having the relationship of 3) is a manufacturing condition by which the strength of the relationship at the time of analysis decreases compared to that in a normal status. There is expectedly a demand that the user wants to keep eyes on a manufacturing condition having undergone the change of 2) or 3) because an operation change in the factory is reflected. By contrast, there is expectedly a demand that the user wants to omit the display of a manufacturing condition having undergone the change of 2) or 3) because there is a spurious correlation caused by a slight change. In this embodiment, the visualization data is generated such that the display mode changes in accordance with which of 1), 2), and 3) is the relationship between the manufacturing conditions $C_j$ and $C_i$. Accordingly, the visualization data generating unit 105 discriminates which of 1), 2), and 3) is the large group including the representative manufacturing condition determined in step S5.

This will be explained below by using a practical example. First, assume that the cause candidate manufacturing conditions estimated by the cause estimation unit 102 are manufacturing conditions $C_1$ to $C_{10}$. Assume also that the visualization data generating unit 105 divides the manufacturing conditions $C_1$ to $C_{10}$ as shown in FIG. 9 by using the first and second relationship data. In the division using the first relationship data, the manufacturing conditions $C_1$ to $C_{10}$ are divided into three large groups GA1, GA2, and GA3. The manufacturing conditions $C_1$, $C_2$, $C_3$, and $C_4$ belong to the large group GA1. The manufacturing conditions $C_5$, $C_6$, and $C_7$ belong to the large group GA2. The manufacturing conditions $C_8$, $C_9$, and $C_{10}$ belong to the large group GA3. On the other hand, in the division using the second relationship data, the manufacturing conditions $C_1$ to $C_{10}$ are divided into three large groups GB1, GB2, and GB3. The manufacturing conditions $C_1$, $C_2$, and $C_3$ belong to the large group GB1. The manufacturing conditions $C_4$, $C_5$, $C_6$, and $C_7$ belong to the large group GB2. The manufacturing conditions $C_8$, $C_9$, and $C_{10}$ belong to the large group GB3.

Figure 10:
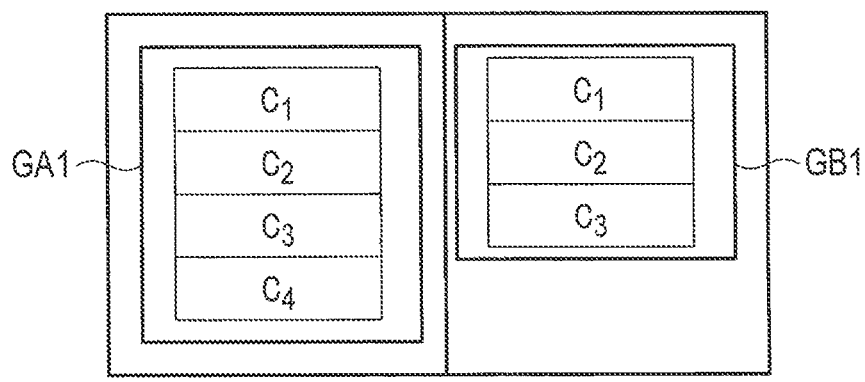
FIG. 10 is a view showing an example of division using second relationship data of the cause candidate manufacturing conditions.
Figure 11:
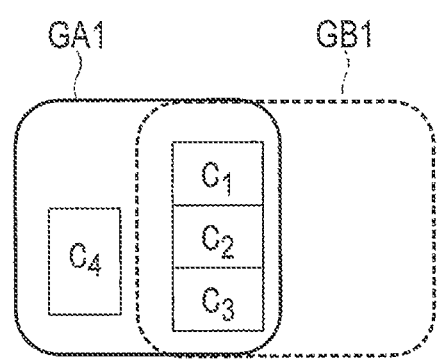
FIG. 11 is a Venn diagram showing the relationship between a large group GA1 and a large group GB1.

Assume that it is determined in step S5 that the representative of the large group GA1 is the manufacturing condition $C_1$. As shown in FIG. 10, the manufacturing condition $C_1$ belongs to the large group GB1 in the division using the second relationship data. In step S6, the large groups GA1 and GB1 are compared. FIG. 11 is a Venn diagram showing the relationship between the large groups GA1 and GB1. As shown in FIG. 11, manufacturing conditions having the relationship 1) with the representative manufacturing condition $C_1$ are the manufacturing conditions $C_2$ and $C_3$. Also, a manufacturing condition having the relationship 2) with the representative manufacturing condition $C_1$ is the manufacturing condition $C_4$. Furthermore, there is no manufacturing condition having the relationship 3) with the representative manufacturing condition $C_1$.

Based on the consideration as described above, the visualization data generating unit 105 lists a representative manufacturing condition, a small group g1 to which a manufacturing condition having the relationship 1) with the representative manufacturing condition belongs, a small group g2 to which a manufacturing condition having the relationship 2) with the representative manufacturing condition belongs, and a small group g3 to which a manufacturing condition having the relationship 3) with the representative manufacturing condition belongs. In the example shown in FIG. 9, the visualization data generating unit 105 lists the manufacturing condition $C_1$ as the representative manufacturing condition, a group of the manufacturing conditions $C_2$ and $C_3$ as the small group g1 to which manufacturing conditions having the relationship 1) with the representative manufacturing condition belong, and a group of the manufacturing condition $C_4$ as the small group g2 to which manufacturing conditions having the relationship 2) with the representative manufacturing condition belong. Also, the visualization data generating unit 105 determines the representative of each of the small groups g1, g2, and g3 based on the criteria a) to f) described above.

The explanation will return to FIG. 2. In step S7, the visualization data generating unit 105 acquires the representative manufacturing condition of each large group.

In step S8, the visualization data generating unit 105 performs a visualization data generating process. The visualization data generating process is a process of generating visualization data for presenting the analytical result of the cause of a specific status of a product to the user. The visualization data generating process will be explained later.

In step S9, the visualization data generating unit 105 displays the analytical result on the display based on the generated visualization data. After that, the process shown in FIG. 2 is terminated.

Figure 12:
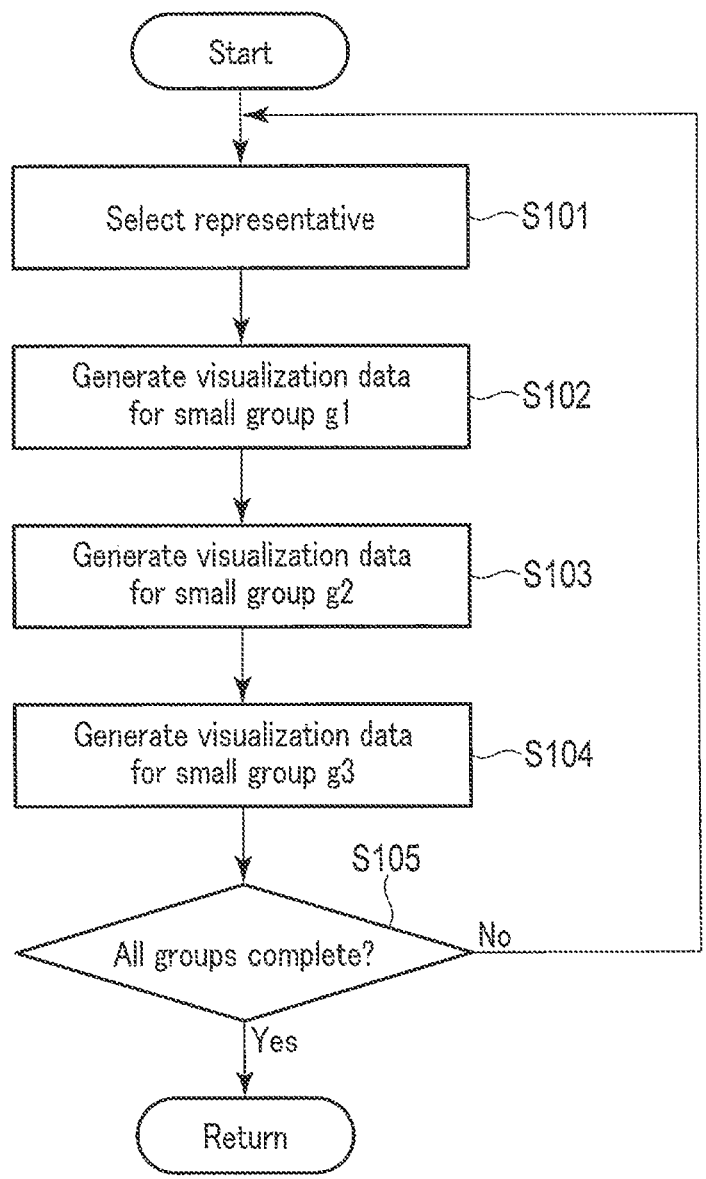
FIG. 12 is a flowchart showing a visualization data generating process.

Next, the visualization data generating process will be explained. FIG. 12 is a flowchart showing the visualization data generating process. In step S101, the visualization data generating unit 105 selects one of the acquired representative cause candidate manufacturing conditions, and generates visualization data for the selected representative cause candidate manufacturing condition. The visualization data of the representative cause candidate manufacturing condition contains information such as item names, cause index values, and analytical results of the cause candidate manufacturing condition. These pieces of information will be explained in detail later.

In step S102, the visualization data generating unit 105 generates visualization data for the small group g1. This visualization data for the small group g1 contains information such as the number of the cause candidate manufacturing conditions belonging to the small group g1, item names of the manufacturing conditions belonging to the small group g1, item names of the representative cause candidate manufacturing condition of the small group g1, the cause index value of each cause candidate manufacturing condition, and the analytical result of the representative cause candidate manufacturing condition of the small group g1. These pieces of information will be explained in detail later.

In step S103, the visualization data generating unit 105 generates visualization data for the small group g2. This visualization data for the small group g2 contains information such as the number of the cause candidate manufacturing conditions belonging to the small group g2, item names of the manufacturing conditions belonging to the small group g2, item names of the representative cause candidate manufacturing condition of the small group g2, the cause index value of each cause candidate manufacturing condition, and the analytical result of the representative cause candidate manufacturing condition of the small group g2. These pieces of information will be explained in detail later.

In step S104, the visualization data generating unit 105 generates visualization data for the small group g3. This visualization data for the small group g3 contains information such as the number of the cause candidate manufacturing conditions belonging to the small group g3, item names of the manufacturing conditions belonging to the small group g3, item names of the representative cause candidate manufacturing condition of the small group g3, the cause index value of each cause candidate manufacturing condition, and the analytical result of the representative cause candidate manufacturing condition of the small group g3. These pieces of information will be explained in detail later.

In step S105, the visualization data generating unit 105 determines whether the generation of the visualization data for all the large groups is complete. If it is determined in step S105 that the generation of the visualization data for all the large groups is incomplete, the process returns to step S101. In this case, the visualization data generating unit 105 selects another representative and performs the same process. If it is determined in step S105 that the generation of the visualization data for all the large groups is complete, the process shown in FIG. 12 is terminated.

Figure 13:
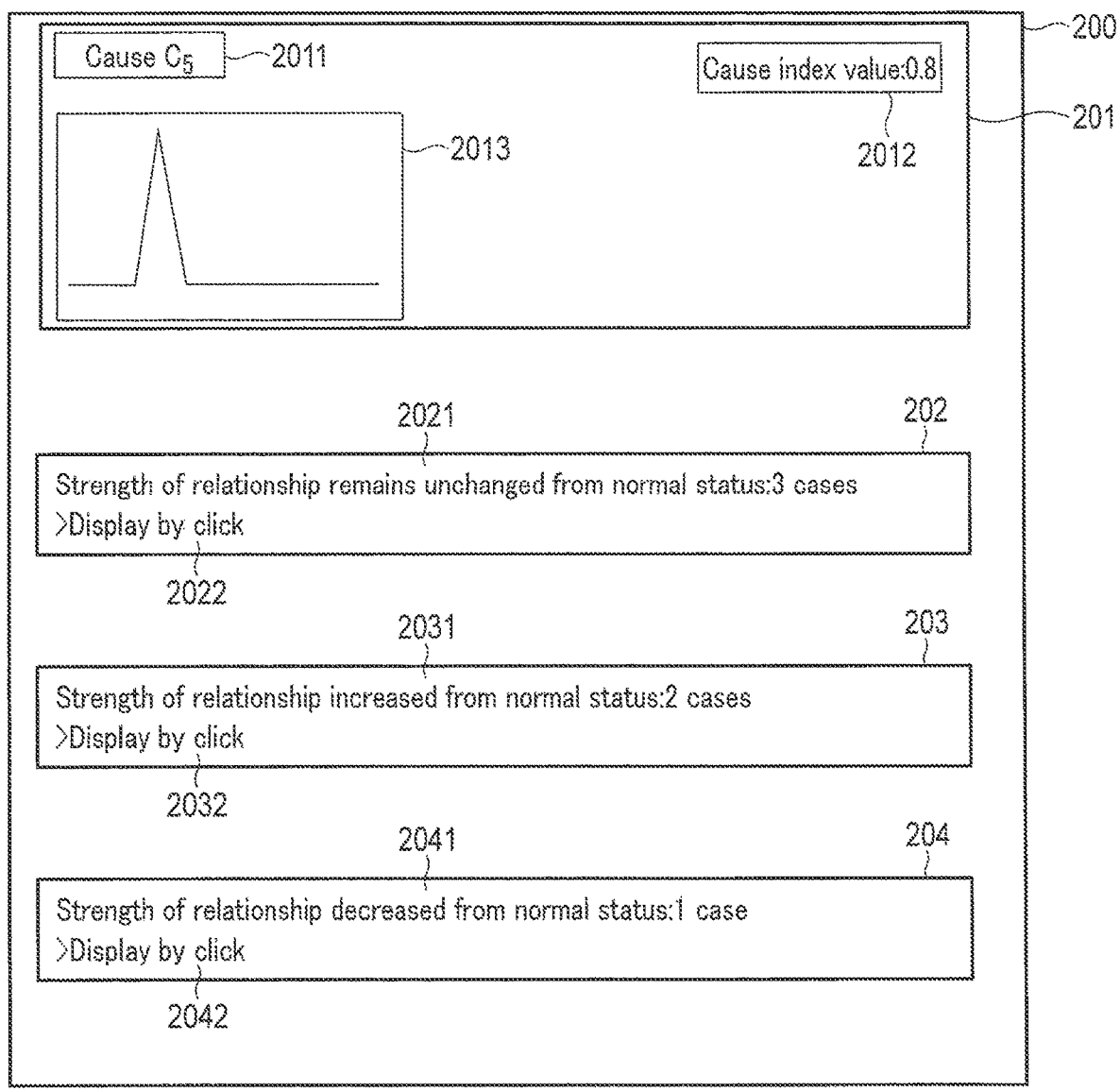
FIG. 13 is a view showing an example of a screen to be displayed based on visualization data in the first embodiment.

FIG. 13 is a view showing an example of a screen to be displayed based on the visualization data in this embodiment. The visualization data generating unit 105 generates visualization data capable of displaying the screen as shown in FIG. 13. This visualization data can be data having a format displayable on the display, e.g., a format such as html (Hypertext Markup Language), xml (eXtensible Markup Language), or JSON (JavaScrip™ Object Notation).

FIG. 13 is an example of a screen to be displayed for the cause candidate manufacturing conditions belonging to one large group determined in step S5. Visualization data for displaying a screen similar to that shown in FIG. 13 is generated for the cause candidate manufacturing conditions belonging to other large groups determined in step S5. In addition, if the status data has a plurality of modes, visualization data for displaying a screen similar to that shown in FIG. 13 is generated for each mode. Furthermore, the visualization data can also be data having a format printable as a drawing or the like, instead of the format displayable on the display.

As shown in FIG. 13, the screen 200 to be displayed based on the visualization data includes a representative information display region 201, a first information display region 202, a second information display region 203, and a third information display region 204.

The representative information display region 201 is a display region for displaying information about the representative cause candidate manufacturing condition selected by the visualization data generating unit 105. The representative information display region 201 includes a display region 2011 for an item name of the representative cause candidate manufacturing condition. In addition, the representative information display region 201 includes a display region 2012 for a cause index value calculated for the representative cause candidate manufacturing condition. The representative information display region 201 also includes a display region 2013 for an analytical result for the representative cause candidate manufacturing condition.

The analytical result to be displayed in the analytical result display region 2013 will be explained below. An example of the analytical result is a graph generated to present information about the cause index value $F(V, C_k)$ to the user. The ordinate of the analytical result is the value of the cause index value $F(V, C_k)$. On the other hand, the abscissa of the analytical result is the cause candidate manufacturing condition $C_k$. That is, the line graph displayed as the analytical result represents that the cause of a specific status of the product is biased to a specific manufacturing condition.

The first information display region 202 is a display region for displaying information about cause candidate manufacturing conditions of the small group g1 belonging to the large group selected by the visualization data generating unit 105. The first information display region 202 includes a display region 2021 for the number of manufacturing conditions having no change in relationship from a normal status, which indicates the number of cause candidate manufacturing conditions belonging to the small group g1. The first information display region 202 also includes a link destination display region 2022. That is, this embodiment omits the display of information about a manufacturing condition having a strong relationship with the representative cause candidate manufacturing condition. This is so because cause candidate manufacturing conditions belonging to the same large group presumably have comparable cause index values because the relationship is strong. The user probably need not monitor all cause candidate manufacturing conditions supposed to have comparable cause index values because the relationship is strong. Therefore, the display of the manufacturing conditions is omitted.

Figure 14:
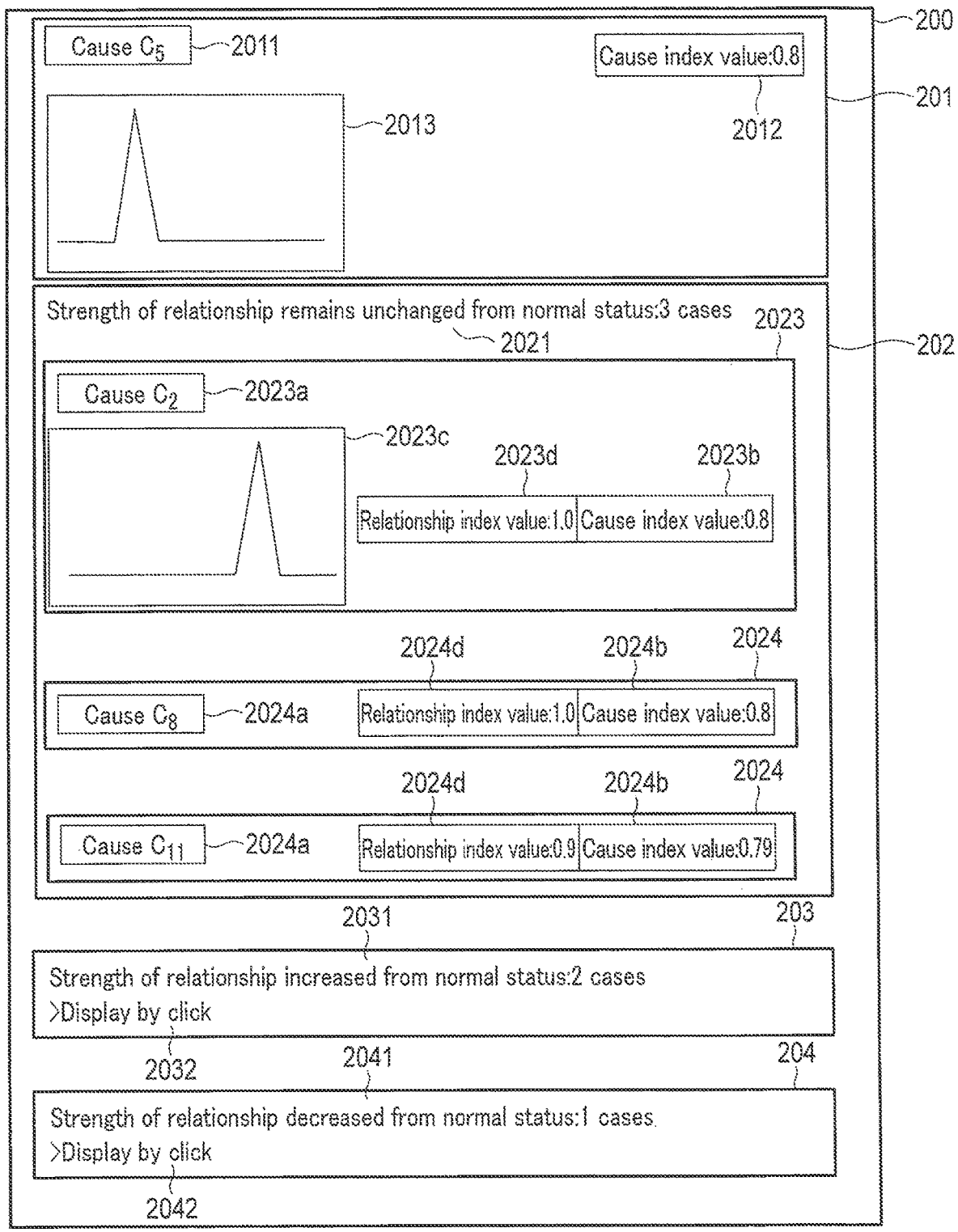
FIG. 14 is a view showing a display example of the screen when the display of link destinations is selected.

When the user selects the link destination display region 2022, as shown in FIG. 14, the first information display region 202 displays a representative information display region 2023 of the small group g1 and information display regions 2024 for other manufacturing conditions belonging to the small group g1.

The representative information display region 2023 includes a display region 2023a for an item name of the representative cause candidate manufacturing condition of the small group g1. The representative information display region 2023 also includes a display region 2023b for a cause index value calculated for the representative cause candidate manufacturing condition of the small group g1. In addition, the representative information display region 2023 includes a display region 2023c for an analytical result of the representative cause candidate manufacturing condition of the small group g1. Furthermore, the representative information display region 2023 includes a display region 2023d for a relationship index value calculated between the representative cause candidate manufacturing condition of a large group to which the small group g1 belongs and the representative cause candidate manufacturing condition of the small group g1.

The information display region 2024 for another manufacturing condition includes a display region 2024a for an item name of another cause candidate manufacturing condition belong to the small group g1. The information display region 2024 for another manufacturing condition also includes a display region 2024b for a cause index value calculated for each cause candidate manufacturing condition belonging to the small group g1. In addition, the information display region 2024 for another manufacturing condition includes a display region 2024d for a relationship index value calculated between the representative manufacturing condition of a large group to which the small group g1 belongs and each of other cause candidate manufacturing conditions belonging to the small group g1.

In the above-described example, detailed information about the manufacturing conditions of the small group g1 is displayed when the link destination display region 2022 is selected. However, it is also possible to omit the display of detailed information like this. For example, the first information display region 202 can include only the display region 2021 for the number of manufacturing conditions having no change in relationship from a normal status, and can only enumerate item names of cause candidate manufacturing conditions having no change in relationship from a normal status. The item names and the like of cause candidate manufacturing conditions displayed in the first information display region 202 can also be emphasized by changing colors or thickening characters.

The explanation will return to FIG. 13. The second information display region 203 is a display region for displaying information about the cause candidate manufacturing conditions of the small group g2 belonging to the large group selected by the visualization data generating unit 105. The second information display region 203 includes a display region 2031 for the number of manufacturing conditions for which the strength of the relationship has increased from that in a normal status, which indicates the number of cause candidate manufacturing conditions belonging to the small group g2. The second information display region 203 also includes only a link destination display region 2032. A display when the link destination display region 2032 is selected can be the same as the display when the link destination display region 2022 is selected. Accordingly, an explanation thereof will be omitted.

The third information display region 204 is a display region for displaying information about the cause candidate manufacturing conditions of the small group g3 belonging to the large group selected by the visualization data generating unit 105. The third information display region 204 includes a display region 2041 for the number of manufacturing conditions for which the strength of the relationship has decreased from that in a normal status, which indicates the number of cause candidate manufacturing conditions belonging to the small group g3. The third information display region 204 also includes only a link destination display region 2042. A display when the link destination display region 2042 is selected can be the same as the display when the link destination display region 2022 is selected. Therefore, an explanation thereof will be omitted.

As described earlier, there is expectedly a demand that the user wants to keep eyes on a manufacturing condition having changed the relationship because an operation change in the factory is reflected. By contrast, there is expectedly a demand that the user wants to omit the display of a manufacturing condition having changed the relationship because there is a spurious correlation caused by a slight change. To meet these demands, the display in the second information display region 203 and the display in the third information display region 204 can be changed from the first information display region 202. For example, the second information display region 203 can be emphasized by, e.g., changing the color from that of the first information display region 202, and the third information display region 204 can be made more inconspicuous than the first information display region 202. The user can perform these settings such as the emphasis.

According to the first embodiment as explained above, the manufacturing conditions of cause candidates for a specific status of a product are estimated. Then, based on the relationship data between the manufacturing conditions, the cause candidate manufacturing conditions are divided into a plurality of groups, and the visualization data is generated so as to, e.g., omit the display of information about manufacturing conditions other than the manufacturing condition of a representative cause candidate in the same group. This reduces the load on the user when he or she monitors a large number of cause candidates.

Also, in the first embodiment, the cause candidate manufacturing conditions are further divided into three small groups in accordance with a change in relationship between group division using the first relationship data and group division using the second relationship data. Then, the visualization data is generated such that the display mode changes from one small group to another. This makes it possible to display an analytical result matching a user's demand corresponding to an actual situation of the factory, and further reduce the load on the user when he or she monitors a large number of cause candidates.

Modification 1 of First Embodiment

Modification 1 of the first embodiment will be explained. In the above-described first embodiment, the data processing apparatus 1 estimates the manufacturing conditions of cause candidates of a specific status of a product, calculates relationship data between the manufacturing conditions, and generates visualization data based on the estimation result and the relationship data. However, the data processing apparatus 1 need not always perform the estimation of cause candidate manufacturing conditions and the calculation of the relationship data between the manufacturing conditions. A peripheral device of the data processing apparatus 1 or a cloud server may also perform the estimation of cause candidate manufacturing conditions and the calculation of the relationship data between the manufacturing conditions. In this case, the data processing apparatus 1 generates visualization data by acquiring information of cause candidate manufacturing conditions, the first relationship data, and the second relationship data by using the acquiring unit 101. That is, the data processing apparatus 1 need not have the cause estimation unit 102, the relationship data calculating unit 103, and the relationship data storing unit 104.

Modification 2 of First Embodiment

Modification 2 of the first embodiment will be explained. In the above-described first embodiment, the relationship data calculating unit 103 calculates the first relationship data whenever the analyzing process shown in FIG. 2 is performed. However, when the analyzing process is executed a plurality of times, e.g., every day or every hour, the relationship data calculating unit 103 can also sequentially record relationship data calculated from manufacturing data used by the cause estimation unit 102 in the plurality of times of the analyzing process, and calculates the mean, median, or the like of the relationship data as the first relationship data. In this case, the relationship data calculating unit 103 can calculate the first relationship data by a weighted mean having a higher weight for a closer date/time.

Modification 3 of First Embodiment

Modification 3 of the first embodiment will be explained. In the above-described first embodiment, the relationship data calculating unit 103 calculates manufacturing data from the first relationship data and the second relationship data. However, the relationship data calculating unit 103 can also use manually input relationship data as the first relationship data or the second relationship data. The user can set relationship data from, e.g., design information of the factory, a physical positional relationship between the facilities, or the pattern of flowing products being manufactured. Assume, for example, that the manufacturing condition $C_1$ is the number of an apparatus such as apparatus 1 or apparatus 2 to be used in a given step and the manufacturing condition $C_2$ is the line number such as line A or line B in the next step. In this case, if a product having passed through apparatus 1 always passes line A due to the design of the factory, the user can set relationship data such that the manufacturing conditions $C_1$ and $C_2$ have a strong relationship. It is also possible to manually correct a part of the relationship data calculated from the manufacturing data by the relationship data calculating unit 103. For example, the user can correct the relationship index value on the screen shown in FIG. 13.

Modification 4 of First Embodiment

Modification 4 of the first embodiment will be explained. In step S5 of the above-described first embodiment, the representative cause candidate manufacturing condition of each large group is determined in accordance with criteria a) to f). However, the representative cause candidate manufacturing condition of each large group can also be determined based on a change in manufacturing condition relationship between group division using the first relationship data and group division using the second relationship data. More specifically, the visualization data generating unit 105 can determine the representative of a large group so that the number of manufacturing conditions included in both of a group divided by using the first relationship data and a group divided by using the second relationship data.

This will be explained by using a practical example. First, assume that the manufacturing conditions of cause candidates estimated by the cause estimation unit 102 are manufacturing conditions $C_1$ to $C_{10}$. Then, assume that the relationship data generating unit 105 divides the manufacturing conditions $C_1$ to $C_{10}$ into groups as shown in FIG. 9 described above by using the first relationship data and the second relationship data.

A case in which the representative cause candidate manufacturing condition of the large group GA1 is the manufacturing condition $C_1$ and a case in which it is the manufacturing condition $C_4$ will be compared below.

First, when the representative cause candidate manufacturing condition of the large group GA1 is the manufacturing condition $C_1$, the large group GA1 and the large group GB1 are compared as shown in FIG. 10. Then, as shown in FIG. 11, manufacturing conditions having relationship 1) with the representative manufacturing condition $C_1$ are the manufacturing conditions $C_2$ and $C_3$. Also, a manufacturing condition having relationship 2) with the representative manufacturing condition $C_1$ is the manufacturing condition $C_4$. Furthermore, there is no manufacturing condition having relationship 3) with the representative manufacturing condition $C_1$.

Next, when the manufacturing condition $C_4$ is the representative cause candidate manufacturing condition, as shown in FIG. 15, the manufacturing condition $C_4$ belongs to the large group GB2 in division using the second relationship data. The large group GA1 and the large group GB2 are compared. FIG. 16 is a Venn diagram showing the relationship between the large group GA1 and the large group GB2. As shown in FIG. 16, there is no manufacturing condition having relationship 1) with the representative manufacturing condition $C_4$. Also, manufacturing conditions having relationship 2) with the representative manufacturing condition $C_4$ are the manufacturing conditions $C_1$, $C_2$, and $C_3$. Furthermore, manufacturing conditions having relationship 3) with the representative manufacturing condition $C_4$ are the manufacturing conditions $C_5$, $C_6$, and $C_7$.

As described previously, 2) and 3) are manufacturing conditions having changed the relationship at the time of analysis from a normal status, and there is a demand that the user wants to keep eyes on the manufacturing conditions having changed in this manner. Assuming that there are few manufacturing conditions that change the relationship at the time of analysis from a normal status, selecting the manufacturing condition $C_1$ as the representative cause candidate manufacturing condition matches this assumption. Based on this consideration, the visualization data generating unit 105 selects a representative that increases the number of manufacturing conditions included in both a group divided by using the first relationship data and a group divided by using the second relationship data. That is, the visualization data generating unit 105 selects the manufacturing condition $C_1$ as the representative of the large group GA1. Processing from step S6 after that is performed in the same manner as in the first embodiment.

In this modification of the first embodiment, the representative of a large group is determined based on the assumption that there are few manufacturing conditions that change the relationship at the time of analysis from a normal state. This makes it possible to display an analytical result matching a user's demand corresponding to an actual situation of the factory, and further reduce the load on the user when he or she monitors a large number of cause candidates.

Second Embodiment

The second embodiment will be explained below. A data processing apparatus of the second embodiment further includes a status data generating unit for detecting whether the status of a product is a specific status based on input manufacturing data. FIG. 17 is a block diagram showing the data processing apparatus according to the second embodiment. In the following description, an explanation of the same parts as those of the first embodiment will be omitted, and only parts different in operation will be explained.

As shown in FIG. 17, a data processing apparatus 1 includes a status data generating unit 106 between an acquiring unit 101 and a cause estimation unit 102.

The status data generating unit 106 receives individual data $Y_l\{Y_l: l=1 \ldots N\}$, and outputs status data $V\_Y_l$ related to the individual data $Y_l$.

The individual data $Y_l$ is data of a measurement value of a test conducted on individual products. The individual data contains data of measurement values of test items such as the dimensions and weight of a product. Depending on the type of product, the individual data $Y_l$ can contain data of measurement values of, e.g., electrical characteristics and physical characteristics of the product. The individual data $Y_l$ like this is data of a measurement value measured for each product by some sort of measuring means.

Also, like the status data V explained in the first embodiment, the status data $V\_Y_l$ is data representing the probability at which the product is in a specific status related to the individual data $Y_l$, and having a real number value from 0.0 to 1.0.

As a method of determining abnormality of a product, a method of setting a threshold for each individual data $Y_l$ and determining that a product has abnormality if the individual data $Y_l$ exceeds the threshold is often used. The status data generating unit 106 calculates a real number value from 0.0 to 1.0 as the status data $V\_Y_l$ in accordance with the difference between the individual data $Y_l$ and the threshold. For example, the status data generating unit 106 allocates 1.0 to the value of the status data $V\_Y_l$ if the individual data $Y_l$ exceeds the threshold. On the other hand, if the value of the individual data $Y_l$ does not exceed the threshold but sufficiently becomes detached from the threshold, the status data generating unit 106 allocates 0.0 to the value of the status data $V\_Y_l$.

The thresholds used in this method are a standard value and a management reference value often used in production management and the like. The standard value is determined for a product to be shipped. A product exceeding the standard value cannot be shipped. On the other hand, the management reference value is a value set on production management in order to ensure the standard value.

The threshold can also be set based on the individual data $Y_l$. For example, the threshold can be set based on a standard deviation $\sigma$. In this case, the threshold can be set at a value of, e.g., $\pm 3\sigma$ or $\pm 4\sigma$ with respect to the standard deviation $\sigma$ estimated based on the mean of the individual data $Y_l$ estimated by the least-square method. In addition, the threshold can be changed in accordance with the sign of the value with respect to the mean.

Also, the individual data $Y_l$ often contains an outlier. Therefore, the mean of the individual data $Y_l$ can also be estimated by an estimation method using a median and a quartile and robust against an outlier, instead of the least-square method. For example, the median of the individual data $Y_l$ can be used as a mean $\mu$ of a normal distribution. In addition, the standard deviation can be set to $\sigma=0.7413 \times IQR$ (interquartile range=distance between first and third quartiles).

The threshold can also be set based on a predetermined percentile point, instead of the standard deviation of the individual data $Y_l$. The threshold can be set by using other well-known methods.

The cause estimation unit 102 of the second embodiment estimates a cause candidate based on the manufacturing data $C_k$ and the status data $V\_Y_l$. The relationship index value calculating method and the like can be the same as those of the first embodiment. Also, the cause estimation unit 102 can estimate a cause candidate without obtaining the status data $V\_Y_l$ by using the manufacturing data $C_k$ and the individual data $Y_l$. For example, the cause estimation unit 102 can perform regression by using the individual data $Y_l$ as a response variable and the manufacturing data $C_k$ as an explanatory variable, and calculate a cause index value $F(Y_l, C_k)$ of the manufacturing data $C_k$ based on the regression coefficient. Note that this method using regression is an example for estimating a cause candidate by using the manufacturing data $C_k$ and the individual data $Y_l$. A cause candidate can be estimated by other well-known methods by using the manufacturing data $C_k$ and the individual data $Y_l$.

Figure 18:
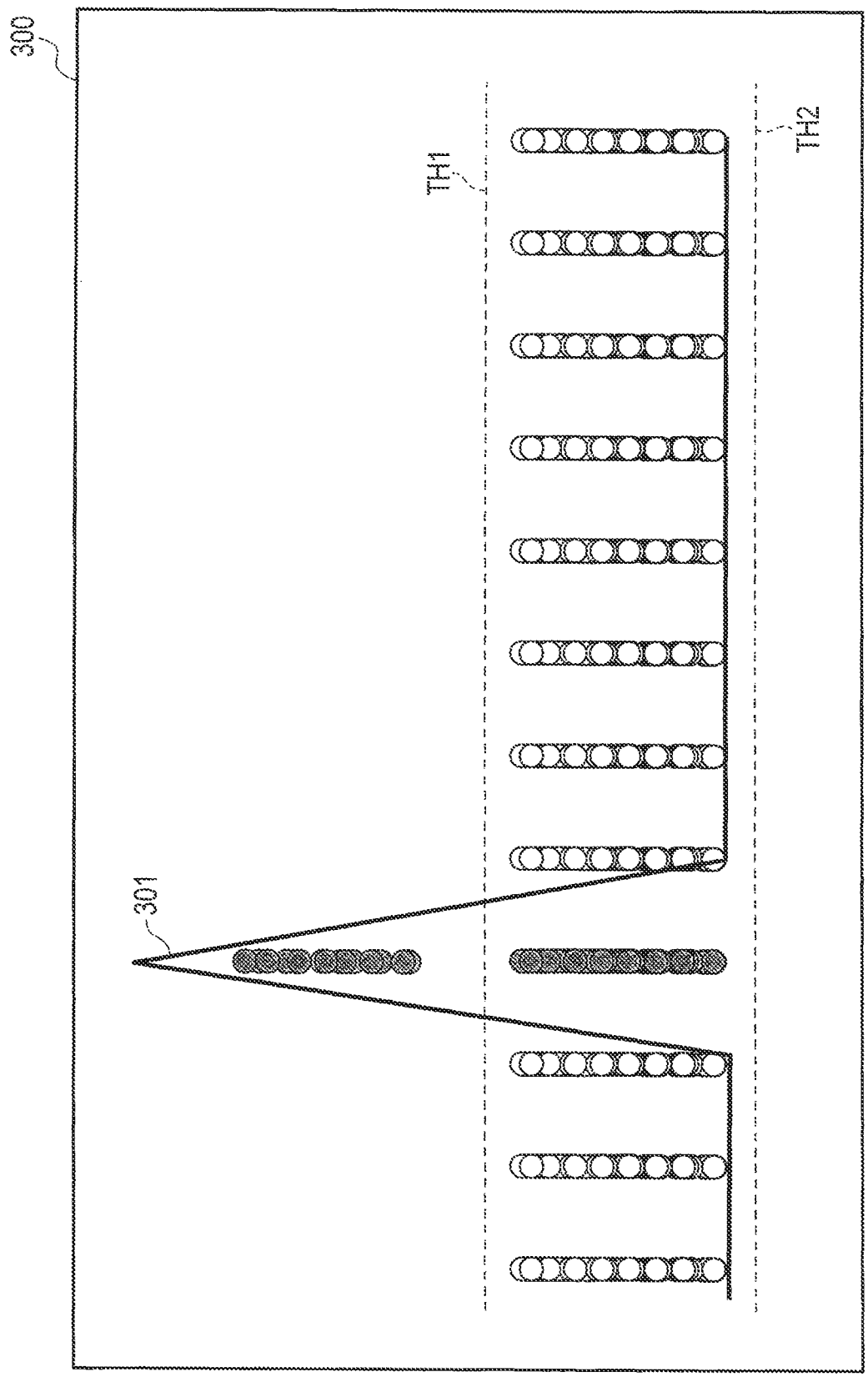
FIG. 18 is a view showing an example of the analytical result in the second embodiment.

The visualization data generating unit 105 of the second embodiment further plots the value of the individual data $Y_l$ in an analytical result 300. FIG. 18 is a view showing an example of the analytical result 300 of the second embodiment. The analytical result 300 of the second embodiment is generated in order to present more detailed information about the cause index value $F(V\_Y_l, C_k)$ to the user. Referring to FIG. 18, the ordinate indicates the individual data $Y_l$, and the abscissa indicates the manufacturing condition $C_k$. Each plot in FIG. 18 represents the value of the individual data $Y_l$ for each individual product. FIG. 18 also shows thresholds TH1 and TH2 used in the calculation of the status data $V\_Y_l$, and a line graph 301 representing the distribution of the cause index value $F(V\_Y_l, C_k)$. A manufacturing condition having a large cause index value $F(V\_Y_l, C_k)$ can be emphasized by, e.g., changing the color.

In the second embodiment as explained above, the data processing apparatus 1 can detect the degree to which each individual product is in a specific status based on the individual data $Y_l$, in addition to the effects explained in the first embodiment.

Third Embodiment

Figure 19:
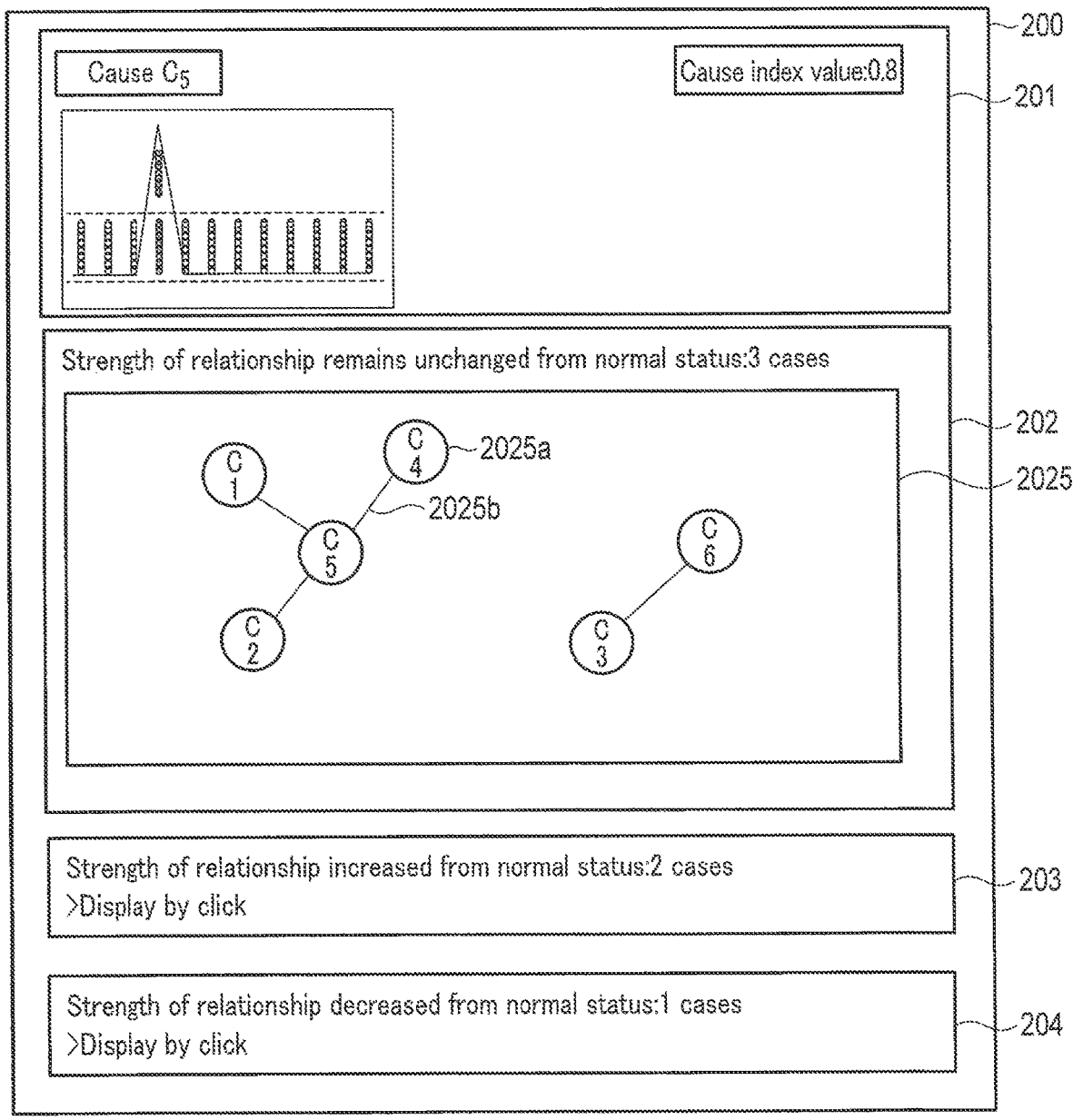
FIG. 19 is a view showing an example of a screen to be displayed based on visualization data in the third embodiment.

The third embodiment will be explained below. FIG. 19 is a view showing an example of a screen to be displayed based on visualization data in the third embodiment. The third embodiment differs from the first embodiment in that a first information display region 202 includes a relationship data display region 2025.

The data display region 2025 includes a drawing such as a graph structure showing the relationship between the representative cause candidate manufacturing condition of a large group and each cause candidate manufacturing condition belonging to a small group g1. The graph structure includes nodes 2025a and links 2025b. The node 2025a represents each cause candidate manufacturing condition. The link 2025b connects the nodes 2025a and represents that the manufacturing conditions of the connected nodes 2025a have a relationship. The strength of the relationship between the manufacturing conditions can be expressed by, e.g., decreasing the distance between the nodes 2025a as a relationship index value increases.

The visualization data can also be generated such that if a given node 2025a is designated, an analytical result of a cause candidate manufacturing condition corresponding to the designated node 2025a is displayed, or the screen changes to an analytical result screen.

In addition, the first information display region 202 includes the relationship data display region 2025 in FIG. 19, but a second information display region 203 and a third information display region can also include the relationship data display region 2025. In this case, the relationship data display region 2025 currently being displayed can be emphasized by changing the color or the like.

According to the third embodiment as' explained above, the relationship between manufacturing conditions can be so displayed as to be visually easy to understand.

Next, the hardware configuration of the data processing apparatus according to each of the above-described embodiments will be explained. FIG. 20 is a block diagram showing the hardware configuration of the data processing apparatus 1. The data processing apparatus 1 includes a CPU (Central Processing Unit) 401, a RAM (Random Access Memory) 402, a ROM (Read Only Memory) 403, a storage 404, a display 405, an input device 406, and a communication module 407. A bus connects the CPU 401, the RAM 402, the ROM 403, the storage 404, the display 405, the input device 406, and the communication module 407. Note that the display 405 need not be included in the data processing apparatus 1 and may also be a peripheral device of the data processing apparatus 1.

The CPU 401 is a processor for executing arithmetic processing, a control process, and the like in accordance with programs. The CPU 401 uses a predetermined area of the RAM 402 as a work area, and executes various processes as the acquiring unit 101, the cause estimation unit 102, the relationship data calculating unit 103, the relationship data storing unit 104, the visualization data generating unit 105, and the status data generating unit 106 described above, in cooperation with programs stored in the ROM 403, the storage 404, and the like.

The RAM 402 is a memory such as an SDRAM (Synchronous Dynamic Random Access Memory). The RAM 402 operates as a work area of the CPU 401. The ROM-403 is a memory for storing programs and various pieces of information such that they cannot be rewritten.

The storage 404 is a device for writing data in and reading out data from a semiconductor storage medium such as a flash memory, a magnetically recordable storage medium such as an HDD (Hard Disc Drive), or an optically recordable storage medium. The storage 404 writes data in and reads out data from the storage medium under the control of the CPU 401.

The display 405 is a display device such as an LCD (Liquid Crystal Display). The display 405 displays various screens such as the screen shown in FIG. 13 based on a display signal from the CPU 401.

The input device 406 is an input device such as a mouse or a keyboard. The input device 406 accepts information input by the user as an instruction signal, and outputs the instruction signal to the CPU 401.

The communication module 407 communicates with an external apparatus across a network under the control of the CPU 401.

Instructions shown in the procedures explained in the above-described embodiments can be executed based on a program as software. When a versatile computer system prestores this program and loads the program, the same effects as those of the above-described data processing apparatus can be obtained. The instructions described in the above embodiments are recorded as a computer-executable program in a magnetic disk (e.g., a flexible disk or a hard disk), an optical disk (e.g., a CD-ROM, a CD-R, a CD-RW, a DVD-ROM, a DVD±R, a DVD±RW, or a Blu-ray® Disc), a semiconductor memory, or a similar recording medium. The storage format can be any form as long as the recording medium is readable by a computer or an embedded system. A computer can implement the same operation as that of the data processing apparatus of the above-described embodiment by loading the program from this recording medium and, based on the program, causing a CPU to execute instructions described in the program. When acquiring or loading the program, the computer can of course acquire or load the program across a network.

Also, based on the instructions of the program installed in a computer or an embedded system from the recording medium, an OS (Operating System) or database management software operating on the computer or a MW (Middle-Ware) such as a network can execute a part of each processing in order to implement this embodiment.

Furthermore, the recording medium of this embodiment is not limited to a medium independent of a computer or an embedded system, but includes a recording medium that downloads a program transmitted across, e.g., a LAN or the Internet and stores or temporarily stores the program.

Also, the recording medium is not limited to one medium, and the recording medium of this embodiment includes a case in which the processes of this embodiment are executed from a plurality of media. The configuration of each medium can be any configuration.

Note that the computer or the embedded system according to this embodiment executes each processing of this embodiment based on the program stored in the recording medium, and can be either a single device such as a personal computer or a microcomputer, or a system in which a plurality of devices are connected across a network.

Note also that the computer according to this embodiment is not limited to a personal computer but includes an arithmetic processing device included in an information processing apparatus, a microcomputer, and the like. That is, the "computer" according to this embodiment is a general term of apparatuses and devices capable of implementing the functions of this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data processing apparatus comprising:
a display; and
a processor including hardware and configured to generate visualization data for displaying estimation results of manufacturing conditions of a plurality of cause candidates for a specific status of a product to be analyzed, based on the estimation results and relationship data representing a relationship between the manufacturing conditions of the plurality of cause candidates, the relationship data including first relationship data as a relationship between a plurality of first manufacturing conditions as a plurality of manufacturing conditions of the product recorded during the analysis, and second relationship data as a relationship between a plurality of second manufacturing conditions corresponding to the first manufacturing conditions and different from the first manufacturing conditions,
wherein the processor:
divides the estimation results of the manufacturing conditions of the plurality of cause candidates into a first group based on the first relationship data, and into a second group based on the second relationship data,
generates the visualization data based on a change in manufacturing condition relationship between the first group and the second group,
divides the cause candidate manufacturing conditions belonging to the first group into large groups each including:
a representative cause candidate manufacturing condition,
a first small group as a group of manufacturing conditions that have not changed a strength of the relationship with the second group including the representative cause candidate manufacturing condition,
a second small group as a group of manufacturing conditions that have increased the strength of the relationship with the second group including the representative cause candidate manufacturing condition,
a third small group as a group of manufacturing conditions that have decreased the strength of the relationship with the second group including the representative cause candidate manufacturing condition, and
generates the visualization data for each of the representative cause candidate manufacturing condition, the first small group, the second small group, and the third small group,
wherein the processor displays, on the display, estimation results of manufacturing conditions of a plurality of cause candidates for a specific status of the product, based on the visualization data,
wherein, in displaying the estimation results, the processor is configured to display:
a representative information display region for displaying information about the representative cause candidate manufacturing condition,
a first information display region for displaying information about the manufacturing conditions of the first small group which have not changed the strength of the relationship with the second group including the representative cause candidate manufacturing condition, wherein the processor displays in the first information display region a first GUI (graphical user interface) element that links to the information about the manufacturing conditions of the first small group such that the information about the manufacturing conditions of the first small group is hidden in the first information display region and is displayed upon operation of the first GUI element;
a second information display region for displaying information about the manufacturing conditions of the second small group that have increased the strength of relationship with the second group including the representative cause candidate manufacturing condition, wherein the processor displays in the second information display region a second GUI (graphical user interface) element that links to the information about the manufacturing conditions of the second small group such that the information about the manufacturing conditions of the second small group is hidden in the second information display region and is displayed upon operation of the second GUI element; and
a third information display region for displaying information about the manufacturing conditions of the third small group that have decreased the strength of relationship with the second group including the representative cause candidate manufacturing condition, wherein the processor displays in the third information display region a third GUI (graphical user interface) element that links to the information about the manufacturing conditions of the third small group such that the information about the manufacturing conditions of the third small group is hidden in the third information display region and is displayed upon operation of the third GUI element; and
wherein the first, second, and third information display regions are displayed in different display modes so as to be visually distinguishable from one another.

2. The apparatus according to claim 1, wherein the processor generates the visualization data such that the cause candidate manufacturing conditions belonging to the second small group or the cause candidate manufacturing conditions belonging to the third small group are emphasized or made inconspicuous with respect to the display of the cause candidate manufacturing conditions belonging to the first small group.

3. The apparatus according to claim 1, wherein the processor determines the representative cause candidate manufacturing condition based on one of a predetermined manufacturing condition, a manufacturing condition used in estimation of the cause candidate manufacturing condition and having a high index value, a first manufacturing condition in an order of manufacturing steps of the product, a first manufacturing condition in an order in a dictionary, and a manufacturing condition by which the number of conditions is maximum or minimum.

4. The apparatus according to claim 1, wherein the processor determines the representative cause candidate manufacturing condition such that the number of cause candidate manufacturing conditions having changed a relationship strength between the first group and the second group decreases.

5. The apparatus according to claim 1, wherein the processor generates the visualization data such that a drawing showing a relationship between the manufacturing conditions is included.

6. The apparatus according to claim 1, wherein the processor further generates status data indicating a degree to which the product is in a specific status, from individual data indicating individual measurement values of the product.

7. The apparatus according to claim 1, wherein the first relationship data and the second relationship data are index values representing a strength of a relationship between the manufacturing conditions.

8. The apparatus according to claim 1, wherein the processor further calculates the first relationship data and the second relationship data based on manufacturing data as data of the manufacturing condition.

9. The apparatus according to claim 8, wherein the processor generates the first relationship data and the second relationship data by dividing the manufacturing condition into a plurality of clusters based on the manufacturing data.

10. A data processing method comprising:
dividing estimation results of manufacturing conditions of a plurality of cause candidates for a specific status of a product to be analyzed into a first group based on first relationship data as a relationship between a plurality of first manufacturing conditions as a plurality of manufacturing conditions of the product recorded during the analysis;
dividing the estimation results of the manufacturing conditions of the plurality of cause candidates into a second group based on second relationship data as a relationship between a plurality of second manufacturing conditions corresponding to the first manufacturing conditions and different from the first manufacturing conditions; and
generating visualization data for displaying the estimation results based on a change in manufacturing condition relationship between the first group and the second group;
wherein the method further comprises:
dividing cause candidate manufacturing conditions belonging to the first group into large groups each including:
a representative cause candidate manufacturing condition,
a first small group as a group of manufacturing conditions that have not changed a strength of the relationship with the second group including the representative cause candidate manufacturing condition,
a second small group as a group of manufacturing conditions that have increased the strength of the relationship with the second group including the representative cause candidate manufacturing condition,
a third small group as a group of manufacturing conditions that have decreased the strength of the relationship with the second group including the representative cause candidate manufacturing condition,
generating the visualization data for each of the representative cause candidate manufacturing condition, the first small group, the second small group, and the third small group, and
displaying, on a display, estimation results of manufacturing conditions of a plurality of cause candidates for a specific status of the product, based on the visualization data,
wherein displaying the estimation results comprises displaying, on the display:
a representative information display region for displaying information about the representative cause candidate manufacturing condition,
a first information display region for displaying information about the manufacturing conditions of the first small group which have not changed the strength of the relationship with the second group including the representative cause candidate manufacturing condition, wherein, in the first information display region, a first GUI (graphical user interface) element is displayed that links to the information about the manufacturing conditions of the first small group such that the information about the manufacturing conditions of the first small group is hidden in the first information display region and is displayed upon operation of the first GUI element;
a second information display region for displaying information about the manufacturing conditions of the second small group that have increased the strength of relationship with the second group including the representative cause candidate manufacturing condition, wherein, in the second information display region, a second GUI (graphical user interface) element is displayed that links to the information about the manufacturing conditions of the second small group such that the information about the manufacturing conditions of the second small group is hidden in the second information display region and is displayed upon operation of the second GUI element; and
a third information display region for displaying information about the manufacturing conditions of the third small group that have decreased the strength of relationship with the second group including the representative cause candidate manufacturing condition, wherein, in the third information display region, a third GUI (graphical user interface) element is displayed that links to the information about the manufacturing conditions of the third small group such that the information about the manufacturing conditions of the third small group is hidden in the third information display region and is displayed upon operation of the third GUI element; and wherein the first, second, and third information display regions are displayed in different display modes so as to be visually distinguishable from one another.

11. A non-transitory storage medium storing a computer-readable data processing program for causing a computer to execute:
dividing estimation results of manufacturing conditions of a plurality of cause candidates for a specific status of a product to be analyzed into a first group based on first relationship data as a relationship between a plurality of first manufacturing conditions as a plurality of manufacturing conditions of the product recorded during the analysis;
dividing the estimation results of the manufacturing conditions of the plurality of cause candidates into a second group based on second relationship data as a relationship between a plurality of second manufacturing conditions corresponding to the first manufacturing conditions and different from the first manufacturing conditions; and
generating visualization data for displaying the estimation results based on a change in manufacturing condition relationship between the first group and the second group;
wherein the processing program further causes the computer to execute:
dividing cause candidate manufacturing conditions belonging to the first group into large groups each including:
a representative cause candidate manufacturing condition,
a first small group as a group of manufacturing conditions that have not changed a strength of the relationship with the second group including the representative cause candidate manufacturing condition,
a second small group as a group of manufacturing conditions that have increased the strength of the relationship with the second group including the representative cause candidate manufacturing condition,
a third small group as a group of manufacturing conditions that have decreased the strength of the relationship with the second group including the representative cause candidate manufacturing condition,
generating the visualization data for each of the representative cause candidate manufacturing condition, the first small group, the second small group, and the third small group, and
displaying, on a display, estimation results of manufacturing conditions of a plurality of cause candidates for a specific status of the product, based on the visualization data,
wherein displaying the estimation results comprises displaying, on the display:
a representative information display region for displaying information about the representative cause candidate manufacturing condition,
a first information display region for displaying information about the manufacturing conditions of the first small group which have not changed the strength of the relationship with the second group including the representative cause candidate manufacturing condition, wherein, in the first information display region, a first GUI (graphical user interface) element is displayed that links to the information about the manufacturing conditions of the first small group such that the information about the manufacturing conditions of the first small group is hidden in the first information display region and is displayed upon operation of the first GUI element;
a second information display region for displaying information about the manufacturing conditions of the second small group that have increased the strength of relationship with the second group including the representative cause candidate manufacturing condition, wherein, in the second information display region, a second GUI (graphical user interface) element is displayed that links to the information about the manufacturing conditions of the second small group such that the information about the manufacturing conditions of the second small group is hidden in the second information display region and is displayed upon operation of the second GUI element; and
a third information display region for displaying information about the manufacturing conditions of the third small group that have decreased the strength of relationship with the second group including the representative cause candidate manufacturing condition, wherein, in the third information display region, a third GUI (graphical user interface) element is displayed that links to the information about the manufacturing conditions of the third small group such that the information about the manufacturing conditions of the third small group is hidden in the third information display region and is displayed upon operation of the third GUI element; and
wherein the first, second, and third information display regions are displayed in different display modes so as to be visually distinguishable from one another.

* * * * *